US012466050B2

(12) United States Patent
Tong et al.

(10) Patent No.: US 12,466,050 B2
(45) Date of Patent: Nov. 11, 2025

(54) POWER TOOL COMBINATION AND AUXILIARY HANDLE

(71) Applicant: Nanjing Chervon Industry Co., Ltd., Nanjing (CN)

(72) Inventors: Shubin Tong, Nanjing (CN); Ziyang Chen, Nanjing (CN); Yonghui Cheng, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 0 days.

(21) Appl. No.: 18/670,331

(22) Filed: May 21, 2024

(65) Prior Publication Data

US 2025/0033185 A1 Jan. 30, 2025

(30) Foreign Application Priority Data

Jul. 26, 2023 (CN) ............................ 202310928605

(51) Int. Cl.
*B25F 5/02* (2006.01)

(52) U.S. Cl.
CPC .................................... *B25F 5/026* (2013.01)

(58) Field of Classification Search
CPC ........... B25F 5/026; B25F 5/001; B25B 21/00
See application file for complete search history.

(56) References Cited

U.S. PATENT DOCUMENTS 5,860,197 A * 1/1999 Fox ........................ B25B 1/103 24/522
2007/0209162 A1* 9/2007 McRoberts ............. B25F 5/026 16/426
2009/0000434 A1* 1/2009 Shinma .................. B25D 17/04 81/491
2011/0003541 A1* 1/2011 Liu ......................... B25F 5/026 451/359
2011/0005355 A1* 1/2011 Brennenstuhl .......... B25F 5/026 81/57.38
2015/0107865 A1* 4/2015 Chen ....................... B25F 5/026 81/489
2015/0306758 A1* 10/2015 Chen ........................ B25G 3/12 16/426
2016/0250740 A1* 9/2016 Ikuta ....................... B25F 5/026 173/198

FOREIGN PATENT DOCUMENTS

EP 1832397 B1 8/2009
EP 2591885 B1 12/2015
EP 2275230 A2 2/2017

* cited by examiner

*Primary Examiner* — Andrew M Tecco
*Assistant Examiner* — Nicholas E Igbokwe
(74) *Attorney, Agent, or Firm* — Greenberg Traurig, LLP

(57) ABSTRACT

A power tool combination includes a power tool and an auxiliary handle. The auxiliary handle includes a second grip, a clamping assembly, and a locking assembly that includes an operation member. When a position state of the operation member is changed, the locking assembly is switched between a locked state and a released state. When the locking assembly is switched to the released state, the operation member applies a drive force to at least one of a first clamping arm and a second clamping arm so that the first clamping arm and the second clamping arm move away from each other.

19 Claims, 20 Drawing Sheets

POWER TOOL COMBINATION AND AUXILIARY HANDLE

RELATED APPLICATION INFORMATION

This application claims the benefit under 35 U.S.C. § 119 (a) of Chinese Patent Application No. 202310928605.6, filed on Jul. 26, 2023, which application is incorporated herein by reference in its entirety.

BACKGROUND

During the operation of a power tool with a grip in the related art, for example, a screwdriver, an electric drill, a hammer drill, or an impact driver drill, a user typically holds the grip with one hand to control the power tool to work. The power tool has a certain weight, and a certain distance exists between the grip and a work accessory outputting torque. Therefore, when high torque is outputted, it is difficult to ensure the stability of the power tool if the power tool, especially a pistol-shaped power tool, is maintained by the only one hand. The power tool commonly flings or twists the hand, injuring the arm.

In a related product, an auxiliary handle or a side handle is disposed on a power tool to enable the user to support the power tool with both hands during operation. The auxiliary handle or side handle is typically mounted on the housing of the power tool through a threaded connection or an auxiliary tool. This connection manner presents the problem that it is complicated, time-consuming, and laborious to mount and detach the auxiliary handle.

This part provides background information related to the present application. The background information is not necessarily the existing art.

SUMMARY

A power tool combination includes a power tool and an auxiliary handle. The auxiliary handle includes a second grip and a locking assembly including an operation member. When a position state of the operation member is changed, the locking assembly is switched between a locked state and a released state.

In some examples, when the locking assembly is switched to the released state, the operation member applies a drive force to at least one of a first clamping arm and a second clamping arm so that the first clamping arm and the second clamping arm move away from each other.

In some examples, the power tool includes a housing including a substantially tubular first housing and a first grip for holding, where the first grip is formed on or connected to the first housing.

In some examples, the auxiliary handle includes: a clamping assembly connected to the second grip and including the first clamping arm and the second clamping arm that are disposed opposite to each other to clamp the first housing; and a locking assembly having the locked state where a relative movement between the clamping assembly and the first housing is restrained and the released state where the first clamping arm and the second clamping arm are caused to move away from each other to allow the relative movement between the clamping assembly and the first housing.

In some examples, the at least one of the first clamping arm and the second clamping arm is connected to the operation member.

In some examples, the locking assembly further includes a connector connecting the first clamping arm to the second clamping arm.

In some examples, the connector is driven by the operation member.

In some examples, positions of the operation member include a first position corresponding to the locked state and a second position corresponding to the released state, where the first position is different from the second position.

In some examples, the operation member rotates about a second axis to switch between the first position and the second position, where the second axis intersects with the extension direction of the second grip.

In some examples, the operation member rotates about a second axis to switch between the first position and the second position, where the second axis is parallel to the extension direction of the second grip.

In some examples, the operation member rotates about a second axis to switch between the first position and the second position, and the connector is rotatably connected to the operation member and is rotatable relative to the operation member about a third axis, where the third axis is offset from the second axis.

In some examples, a first end of the connector is connected to the first clamping arm, and a second end of the connector is limited by the second clamping arm when the operation member is at the first position.

In some examples, a limit member is disposed on the second clamping arm, and the second end of the connector is limited by the limit member.

In some examples, when the position state of the operation member is changed, the operation member drives the at least one of the first clamping arm and the second clamping arm to slide along the extension direction of the second grip.

In some examples, when the position state of the operation member is changed, a position state of the second grip relative to the housing is not changed.

In some examples, when the position state of the operation member is changed, a position of the operation member relative to the second grip is changed.

In some examples, the first housing is configured to have a longitudinal axis, and the locking assembly is located above the first housing in the direction of the longitudinal axis.

In some examples, the extension direction of the second grip is substantially perpendicular to the extension direction of the longitudinal axis.

A power tool combination includes a power tool and an auxiliary handle. The auxiliary handle includes a second grip and a locking assembly further including an operation member. When a position state of the operation member is changed, a position state of the second grip relative to a housing is not changed.

In some examples, when the position state of the operation member is changed, the operation member drives at least one of a first clamping arm and a second clamping arm to move.

In some examples, the power tool includes the housing including a substantially tubular first housing and a first grip for holding, where the first grip is formed on or connected to the first housing.

In some examples, the auxiliary handle includes: a clamping assembly connected to the second grip and including the first clamping arm and the second clamping arm that are disposed opposite to each other to clamp the first housing; and a locking assembly having a locked state where a relative movement between the clamping assembly and the first housing is restrained and a released state where the first clamping arm and the second clamping arm are caused to move away from each other to allow the relative movement between the clamping assembly and the first housing.

An auxiliary handle is suitable for connection to a substantially tubular first housing of a power tool. The auxiliary handle includes a second grip and a locking assembly including an operation member. When a position state of the operation member is changed, the locking assembly is switched between a locked state and a released state, and when the locking assembly is switched to the released state, the operation member applies a drive force to at least one of a first clamping arm and a second clamping arm so that the first clamping arm and the second clamping arm move away from each other.

In some examples, the auxiliary handle includes: a clamping assembly connected to the second grip and including the first clamping arm and the second clamping arm that are disposed opposite to each other to clamp the first housing; and a locking assembly having the locked state where a relative movement between the clamping assembly and the first housing is restrained and the released state where the first clamping arm and the second clamping arm are caused to move away from each other to allow the relative movement between the clamping assembly and the first housing.

In some examples, when the position state of the operation member is changed, the operation member drives the at least one of the first clamping arm and the second clamping arm to slide along the extension direction of the second grip.

In some examples, when the position state of the operation member is changed, a position state of the second grip relative to the first housing is not changed.

In some examples, when the position state of the operation member is changed, a position of the operation member relative to the second grip is changed.

DETAILED DESCRIPTION

Figure 1:
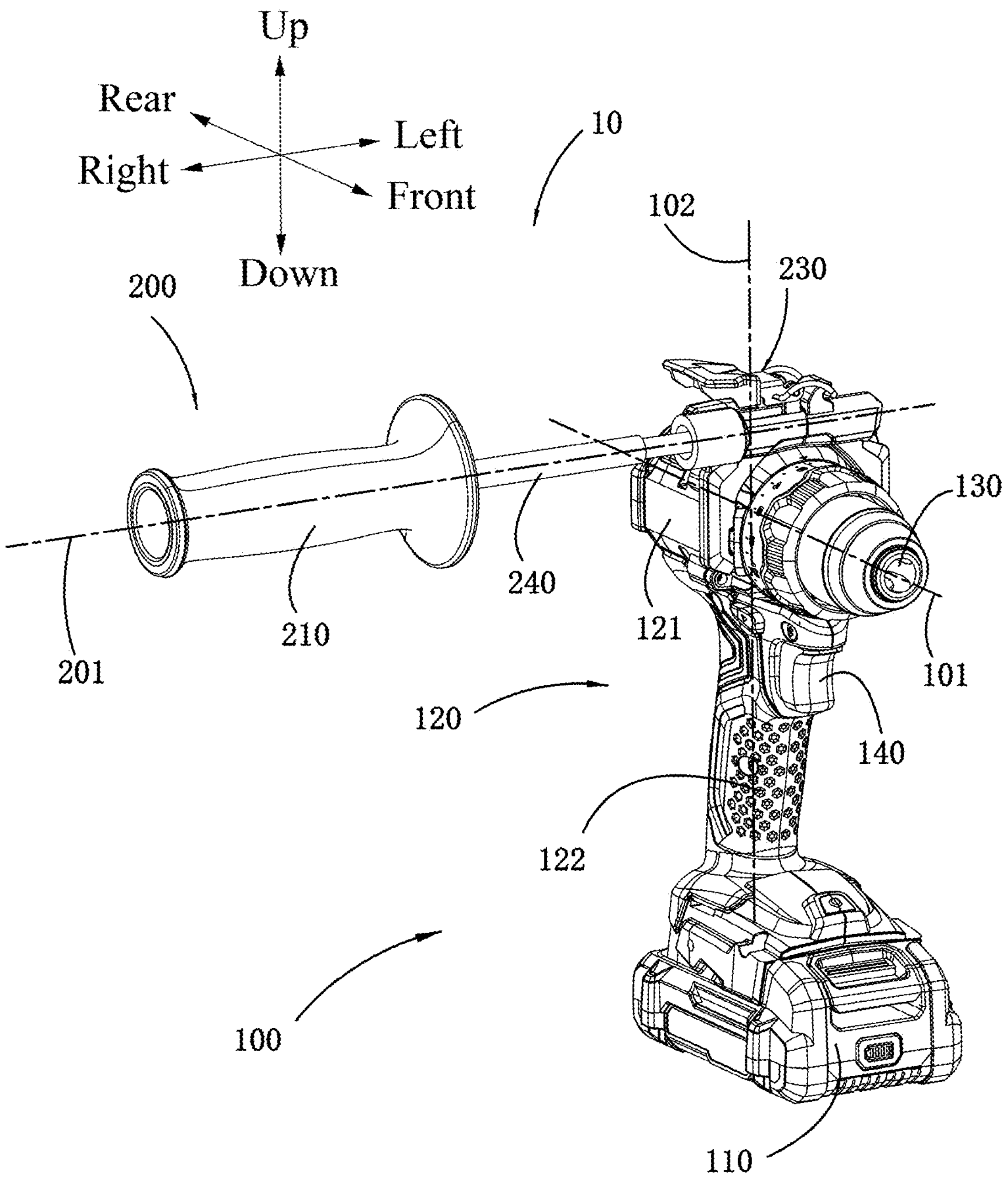
FIG. 1 is a structural view of a power tool combination according to an example of the present application.

Before any examples of this application are explained in detail, it is to be understood that this application is not limited to its application to the structural details and the arrangement of components set forth in the following description or illustrated in the above drawings.

In this application, the terms “comprising”, “including”, “having” or any other variation thereof are intended to cover an inclusive inclusion such that a process, method, article or device comprising a series of elements includes not only those series of elements, but also other elements not expressly listed, or elements inherent in the process, method, article, or device. Without further limitations, an element defined by the phrase "comprising a . . . " does not preclude the presence of additional identical elements in the process, method, article, or device comprising that element.

In this application, the term "and/or" is a kind of association relationship describing the relationship between associated objects, which means that there can be three kinds of relationships. For example, A and/or B can indicate that A exists alone, A and B exist simultaneously, and B exists alone. In addition, the character "/" in this application generally indicates that the contextual associated objects belong to an "and/or" relationship.

In this application, the terms "connection", "combination", "coupling" and "installation" may be direct connection, combination, coupling or installation, and may also be indirect connection, combination, coupling or installation. Among them, for example, direct connection means that two members or assemblies are connected together without intermediaries, and indirect connection means that two members or assemblies are respectively connected with at least one intermediate members and the two members or assemblies are connected by the at least one intermediate members. In addition, "connection" and "coupling" are not limited to physical or mechanical connections or couplings, and may include electrical connections or couplings.

In this application, it is to be understood by those skilled in the art that a relative term (such as "about", "approximately", and "substantially") used in conjunction with quantity or condition includes a stated value and has a meaning dictated by the context. For example, the relative term includes at least a degree of error associated with the measurement of a particular value, a tolerance caused by manufacturing, assembly, and use associated with the particular value, and the like. Such relative term should also be considered as disclosing the range defined by the absolute values of the two endpoints. The relative term may refer to plus or minus of a certain percentage (such as 1%, 5%, 10%, or more) of an indicated value. A value that did not use the relative term should also be disclosed as a particular value with a tolerance. In addition, "substantially" when expressing a relative angular position relationship (for example, substantially parallel, substantially perpendicular), may refer to adding or subtracting a certain degree (such as 1 degree, 5 degrees, 10 degrees or more) to the indicated angle.

In this application, those skilled in the art will understand that a function performed by an assembly may be performed by one assembly, multiple assemblies, one member, or multiple members. Likewise, a function performed by a member may be performed by one member, an assembly, or a combination of members.

In this application, the terms "up", "down", "left", "right", "front", and "rear" and other directional words are described based on the orientation or positional relationship shown in the drawings, and should not be understood as limitations to the examples of this application. In addition, in this context, it also needs to be understood that when it is mentioned that an element is connected "above" or "under" another element, it can not only be directly connected "above" or "under" the other element, but can also be indirectly connected "above" or "under" the other element through an intermediate element. It should also be understood that orientation words such as upper side, lower side, left side, right side, front side, and rear side do not only represent perfect orientations, but can also be understood as lateral orientations. For example, lower side may include directly below, bottom left, bottom right, front bottom, and rear bottom.

In this application, the terms "controller", "processor", "central processor", "CPU" and "MCU" are interchangeable. Where a unit "controller", "processor", "central processing", "CPU", or "MCU" is used to perform a specific function, the specific function may be implemented by a single aforementioned unit or a plurality of the aforementioned unit.

In this application, the term "device", "module" or "unit" may be implemented in the form of hardware or software to achieve specific functions.

In this application, the terms "computing", "judging", "controlling", "determining", "recognizing" and the like refer to the operations and processes of a computer system or similar electronic computing device (e.g., controller, processor, etc.).

To clearly illustrate the technical solutions of the present application, up, down, left, right, front, and rear are defined in the drawings of the specification.

A power tool combination 10 provided by the present application includes a power tool. For example, the power tool may be a screwdriver, a hammer drill, a drilling tool, an impact driver drill, an impact wrench, a nail gun, an angle grinder, or an angle drill.

Figure 2:
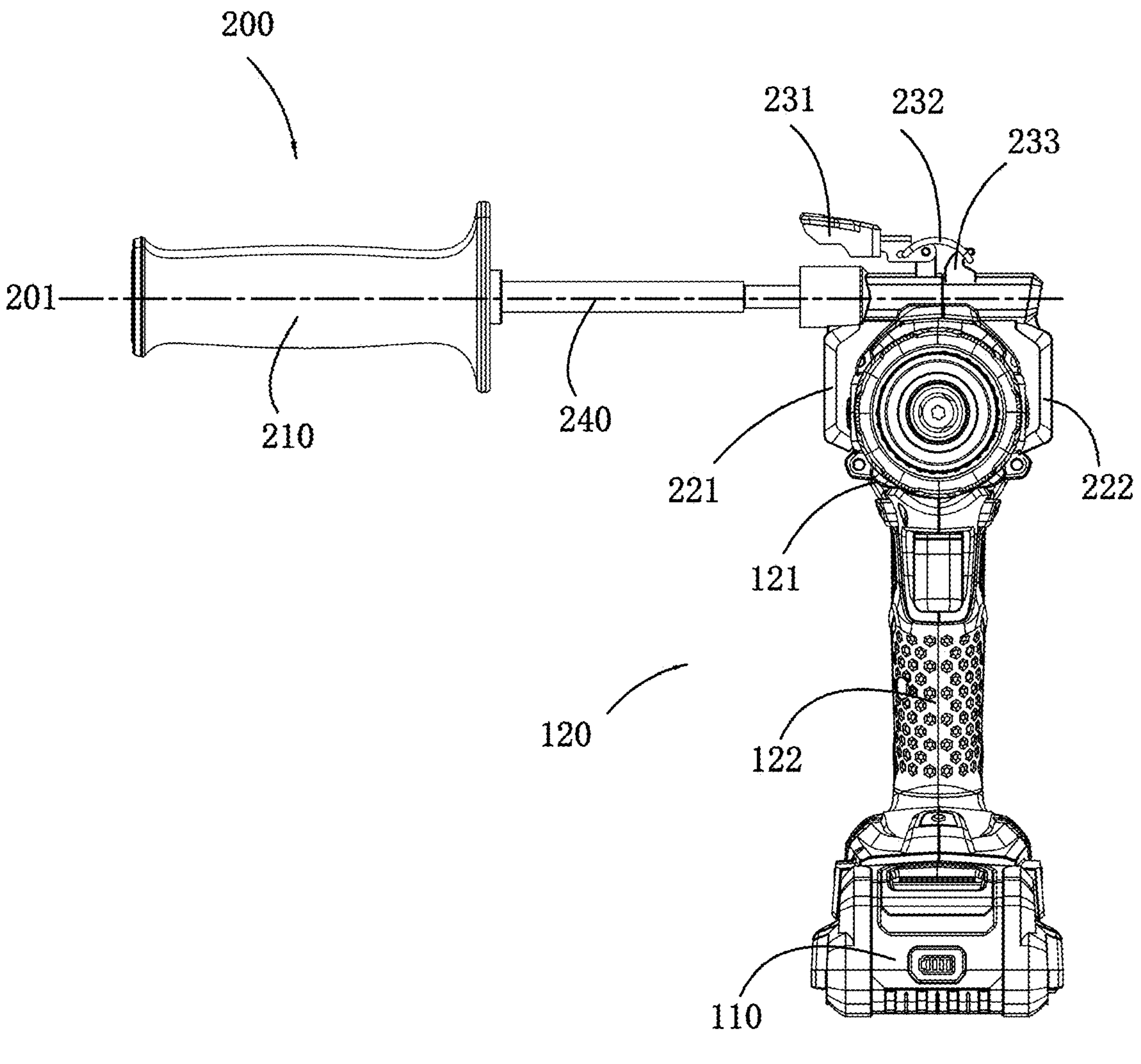
FIG. 2 is a side view of a power tool combination according to an example of the present application.
Figure 3:
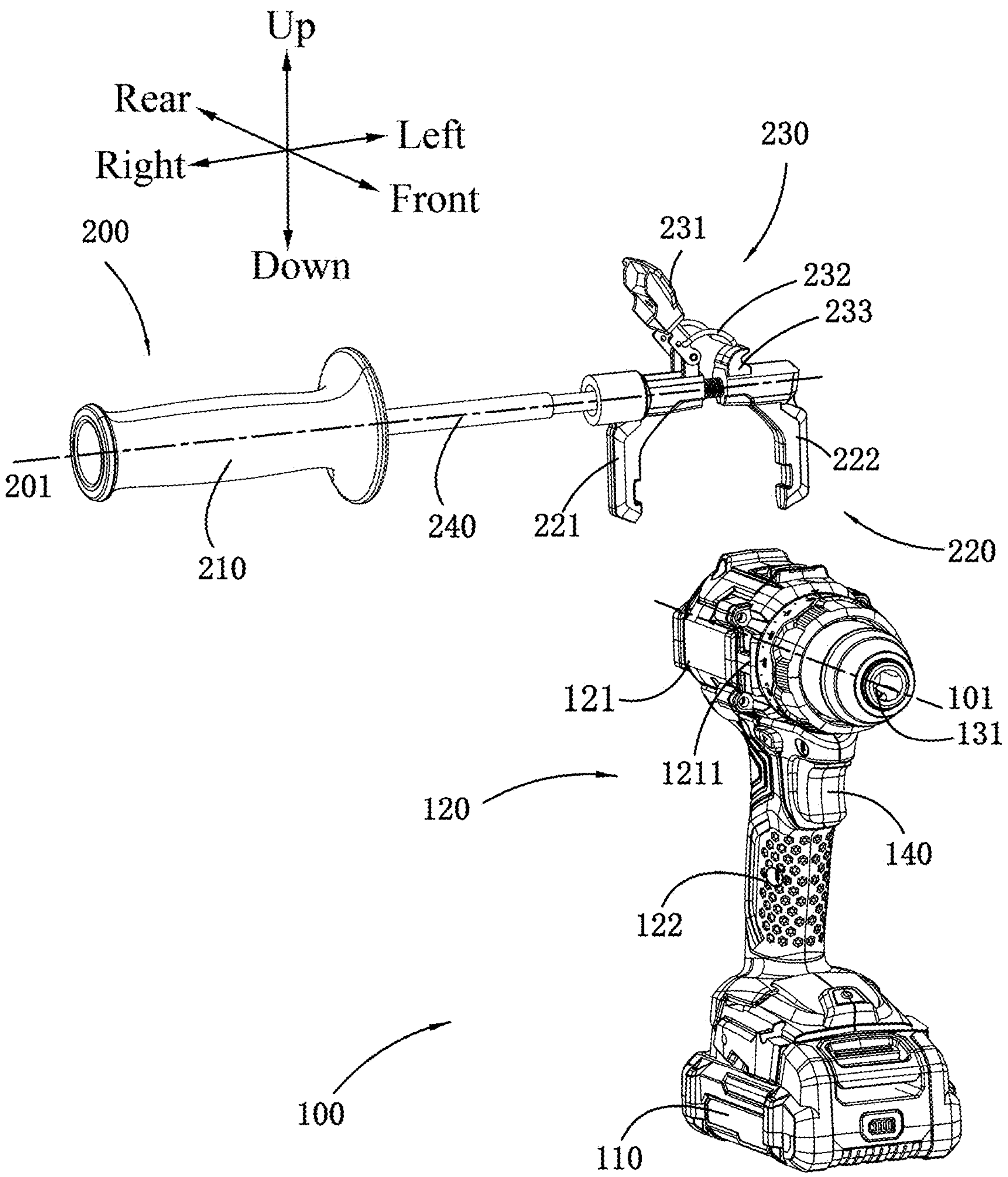
FIG. 3 is an exploded view showing the structure of a power tool combination according to an example of the present application.

Referring to FIGS. 1 to 3, an electric drill 100 is used as an example for describing the power tool in an example of the present application. The electric drill 100 includes a power supply. The power supply is used for supplying electrical energy to the electric drill 100. In this example, the power supply is a battery pack 110. The battery pack 110 cooperates with a corresponding power supply circuit to power corresponding components in the electric drill 100. It is to be understood by those skilled in the art that the power supply is not limited to the battery pack 110 and the corresponding components in the machine may be powered through mains electricity or an alternating current power supply in cooperation with corresponding rectifier, filter, and voltage regulation circuits. For convenience of the subsequent description, the battery pack 110 is used instead of the power supply, but this does not limit the present invention.

The electric drill 100 includes a housing 120, a motor (not shown), and an output mechanism 130. The housing 120 includes a first housing 121 and a first grip 122 for holding. The first grip 122 is formed on or connected to the first housing 121. The first housing 121 includes a motor housing for accommodating the motor and an output housing for accommodating at least part of the output mechanism 130. The output housing is connected to the front end of the motor housing. The first grip 122 is held by a user. The first grip 122 and the motor housing form a T-shaped structure or an L-shaped structure that is convenient for the user to hold and operate. The battery pack 110 is connected to an end of the first grip 122. The battery pack 110 is detachably connected to the first grip 122.

The electric drill 100 further includes a switch 140 mounted on the first grip 122. When holding the first grip 122, the user can trigger the switch 140 relatively conveniently. The switch 140 may be configured to be a main switch for activating the electric drill 100.

The motor includes a drive shaft (not shown in the figure). The output mechanism 130 is used for receiving torque provided by the motor and outputting the torque. The output mechanism 130 includes an output shaft 131 for connecting a work accessory and driving the work accessory to rotate. The front end of the output shaft 131 can be connected to corresponding work accessories, such as a screwdriver, a drill bit, and a socket, to implement different functions. The output shaft 131 is rotatable about a first axis 101.

The motor may directly drive the output mechanism 130, or a transmission mechanism may be disposed between the motor and the output mechanism 130. The transmission mechanism is used for implementing power transmission between the motor and the output mechanism 130. The motor, the transmission mechanism, and the output mechanism 130 are disposed in the first housing 121. The transmission assembly includes a planetary gear train for deceleration. A one-stage or multi-stage planetary gear train may be provided. The planetary gear train converts an output rotational speed of the motor according to a certain gear ratio to achieve appropriate torque. In addition, the transmission mechanism further includes a shift assembly to implement multi-gear output through multiple sets of gears having different gear ratios. The working principle according to which a planet gear performs the deceleration and the deceleration implemented by the transmission mechanism have been completely disclosed to those skilled in the art. Therefore, a detailed description is omitted herein for the brevity of the specification.

In this example, the transmission mechanism further includes an impact assembly for providing an impact force for the output shaft 131. The transmission mechanism further includes a locking assembly to implement a shaft locking function. The locking assembly is used for locking the output shaft when the output shaft 131 transmits the torque to the drive shaft in an opposite direction. It is to be understood that the transmission mechanism may be provided with no impact assembly in another alternative example.

The power tool combination 10 further includes an auxiliary handle 200. The auxiliary handle 200 is selectively connected to the first housing 121 of the power tool and is used for clamping or releasing the first housing 121. The first housing 121 is substantially tubular.

The auxiliary handle 200 includes a second grip 210, a clamping assembly 220, and a locking assembly 230. The clamping assembly 220 is connected to the second grip 210 and includes a first clamping arm 221 and a second clamping arm 222 that are disposed opposite to each other to clamp the first housing 121. The locking assembly 230 includes a locked state (as shown in FIG. 2) where a relative movement between the clamping assembly 220 and the first housing 121 is restrained and a released state (as shown in FIG. 3) where the first clamping arm 221 and the second clamping arm 222 are caused to move away from each other to allow the relative movement between the clamping assembly 220 and the first housing 121. The locking assembly 230 includes an operation member 231. When a position state of the operation member 231 is changed, the locking assembly 230 is switched between the locked state and the released state. When the locking assembly 230 is switched to the released state, the operation member 231 applies a drive force to at least one of the first clamping arm 221 and the second clamping arm 222 so that the first clamping arm 221 and the second clamping arm 222 move away from each other. The change of the position state of the operation member 231 refers to the change of the spatial position of the operation member 231 including, but not limited to, the displacement of the operation member 231, the change of the angle of the operation member 231, the rotational displacement of the operation member 231, and the change of the spatial position of the operation member 231 caused by the deformation of the operation member 231.

When the locking assembly 230 is in the locked state, the first clamping arm 221 and the second clamping arm 222 clamp the first housing 121, and the user may hold the first grip 122 in one hand and the second grip 210 in the other hand. Different portions are held by two hands so that holding stability is improved. When the auxiliary handle 200 needs to be detached, the position of the operation member 231 is changed so that the operation member 231 applies the drive force to the at least one of the first clamping arm 221 and the second clamping arm 222 to cause the first clamping arm 221 and the second clamping arm 222 to move away from each other. Thus, the locking assembly 230 is switched from the locked state to the released state, and the first clamping arm 221 and the second clamping arm 222 release the first housing 121. No additional component is required to provide the force that causes the first clamping arm 221 and the second clamping arm 222 to move away from each other. On the contrary, when the auxiliary handle 200 needs to be fixed, the first clamping arm 221 and the second clamping arm 222 are disposed on two sides of the first housing 121. The position of the operation member 231 is changed so that the operation member 231 applies the drive force to the at least one of the first clamping arm 221 and the second clamping arm 222 to cause the first clamping arm 221 and the second clamping arm 222 to approach each other. Thus, the locking assembly 230 is switched from the released state to the locked state, and the first clamping arm 221 and the second clamping arm 222 clamp the first housing 121 and ensure a clamping state.

As described above, the position state of the operation member 231 is changed so that the first clamping arm 221 and the second clamping arm 222 can be driven to approach each other or move away from each other. Thus, the clamping assembly 220 clamps the first housing 121 or releases the first housing 121. The operation is convenient and saves time and effort. The auxiliary handle 200 can be detached or mounted quickly with one hand.

A first engagement structure 1211 is disposed on a first side of the first housing 121, and a second engagement structure (not shown) is disposed on a second side of the first housing 121. The first clamping arm 221 is provided with a first engagement portion 2211 engaging with the first engagement structure 1211, and the second clamping arm 222 is provided with a second engagement portion 2221 engaging with the second engagement structure. When the first clamping arm 221 and the second clamping arm 222 clamp the first housing 121, the first engagement portion 2211 mates with the first engagement structure 1211, and the second engagement portion 2221 mates with the second engagement structure so that the clamping is stable.

In this example, the first engagement structure 1211 is a first protrusion disposed on the first side of the first housing 121, the second engagement structure is a second protrusion disposed on the second side of the first housing 121, the first engagement portion 2211 is a first slot provided on the first clamping arm 221, and the second engagement portion 2221 is a second slot provided on the second clamping arm 222. When the first clamping arm 221 and the second clamping arm 222 clamp the first housing 121, the first protrusion is inserted into the first slot, and the second protrusion is inserted into the second slot. The first protrusion and the second protrusion mate with the first slot and the second slot to increase the contact areas and perform a limit function so that the clamping is stable. In another example, the position of the first protrusion and the position of the second protrusion are exchangeable with the position of the first slot and the position of the second slot.

In some examples, only the first engagement structure 1211 is disposed on the first housing 121. Correspondingly, the first engagement portion 2211 mating with the first engagement structure 1211 is provided on the first clamping arm 221. It is to be understood that the number of first engagement structures and the number of first engagement portions are adjustable according to design requirements.

The first housing 121 extends substantially along the direction of the first axis 101. The direction in which the first clamping arm 221 and the second clamping arm 222 move relative to each other is perpendicular to the first axis 101. Thus, it is convenient to clamp the first housing 121. The second grip 210 extends substantially along the direction of a first straight line 201. The first straight line 201 intersects with the first axis 101. In this example, the first straight line 201 is substantially perpendicular to the first axis 101 so that a certain distance exists between the second grip 210 and the work accessory that outputs the torque, thereby ensuring security. It is defined that the first axis 101 extends along a front and rear direction and the first straight line 201 extends along a left and right direction.

As shown in FIG. 1, the first housing 121 is configured to have a longitudinal axis 102. The locking assembly 230 is located above the first housing 121 along the extension direction of the longitudinal axis 102. The first grip 122 extends substantially parallel to the longitudinal axis 102. The battery pack 110 is disposed at the lower end of the first grip 122, and the first housing 121 is disposed at the upper end of the first grip 122. The locking assembly 230 is located above the first housing 121 along the extension direction of the longitudinal axis 102. Thus, it is convenient to clamp the first housing 121. The longitudinal axis 102 extends along an up and down direction.

When the position state of the operation member 231 is changed, the operation member 231 drives the at least one of the first clamping arm 221 and the second clamping arm 222 to slide along the extension direction of the second grip 210. In this example, the operation member 231 can drive the first clamping arm 221 to slide along the extension direction of the second grip 210, and the second clamping arm 222 is fixed and stationary. In another example, when the position of the operation member 231 is changed, the first clamping arm 221 and the second clamping arm 222 can be driven to move simultaneously to approach each other or move away from each other.

The at least one of the first clamping arm 221 and the second clamping arm 222 is connected to the operation member 231. In this example, the first clamping arm 221 is connected to the operation member 231. The position of the operation member 231 is changed so that the first clamping arm 221 can be driven to move away from or approach the second clamping arm 222. In another example, the second clamping arm 222 is connected to the operation member 231. The position of the operation member 231 is changed so that the second clamping arm 222 can be driven to move away from or approach the first clamping arm 221. In another example, both the first clamping arm 221 and the second clamping arm 222 are connected to the operation member 231. The position of the operation member 231 is changed so that the second clamping arm 222 and the first clamping arm 221 can be driven to move simultaneously to approach each other or move away from each other.

In this example, after the clamping assembly 220 clamps the first housing 121, a position state of the second grip 210 relative to the housing 120 is not changed, thereby ensuring the stability with the second grip 210 is held. When the position state of the operation member 231 is changed, the position state of the second grip 210 relative to the housing 120 is not changed. When the position state of the operation member 231 is changed, a position of the operation member 231 relative to the second grip 210 is changed. The operation member 231 is not driven by the second grip 210 to change its position state. An operator may hold the second grip 210 with one hand and drive, with the other hand, the operation member 231 to move. The operation is convenient.

Referring to FIGS. 4 to 8, the auxiliary handle 200 further includes a connecting rod 240. The connecting rod 240 is disposed at an end of the second grip 210. Both the first clamping arm 221 and the second clamping arm 222 are disposed on the connecting rod 240. The at least one of the first clamping arm 221 and the second clamping arm 222 is slidably connected to the connecting rod 240. When the position of the operation member 231 is changed, the first clamping arm 221 and/or the second clamping arm 222 can be driven to slide along the connecting rod 240.

In this example, the first clamping arm 221 is slidably connected to the connecting rod 240. When the position of the operation member 231 is changed, the first clamping arm 221 can be driven to slide along the connecting rod 240. The second clamping arm 222 and the connecting rod 240 are fixedly connected to each other and may be threadedly connected to each other specifically. Thus, the second clamping arm 222 is convenient to mount or detach. When the first clamping arm 221 slides along the connecting rod 240, the first clamping arm 221 and the second clamping arm 222 approach each other or move away from each other.

The connecting rod 240 includes a smooth segment 241 and a threaded segment 242. The smooth segment 241 is connected to the second grip 210. The threaded segment 242 is disposed at the end of the smooth segment 241 facing away from the second grip 210. The first clamping arm 221 is slidably connected to the smooth segment 241. The second clamping arm 222 is threadedly connected to the threaded segment 242. Therefore, the first clamping arm 221 is located between the second clamping arm 222 and the second grip 210. When the position of the operation member 231 is changed, the first clamping arm 221 can be driven to slide along the smooth segment 241. In another example, the second clamping arm 222 may be configured to be located between the first clamping arm 221 and the second grip 210, and the operation member 231 can drive the first clamping arm 221 to slide.

The smooth segment 241 is provided with a step structure. The smooth segment 241 includes at least one limit step 243 for limiting the stroke of the first clamping arm 221. In some examples, the smooth segment 241 includes a telescopic portion to cause the length of the smooth segment 241 to be changed according to requirements so that the requirements of different working conditions on a holding force are met.

The at least one of the first clamping arm 221 and the second clamping arm 222 is connected to the operation member 231. In this example, the first clamping arm 221 is connected to the operation member 231, and the position of the operation member 231 is changed so that the first clamping arm 221 is driven to change its position on the connecting rod 240.

Figure 4:
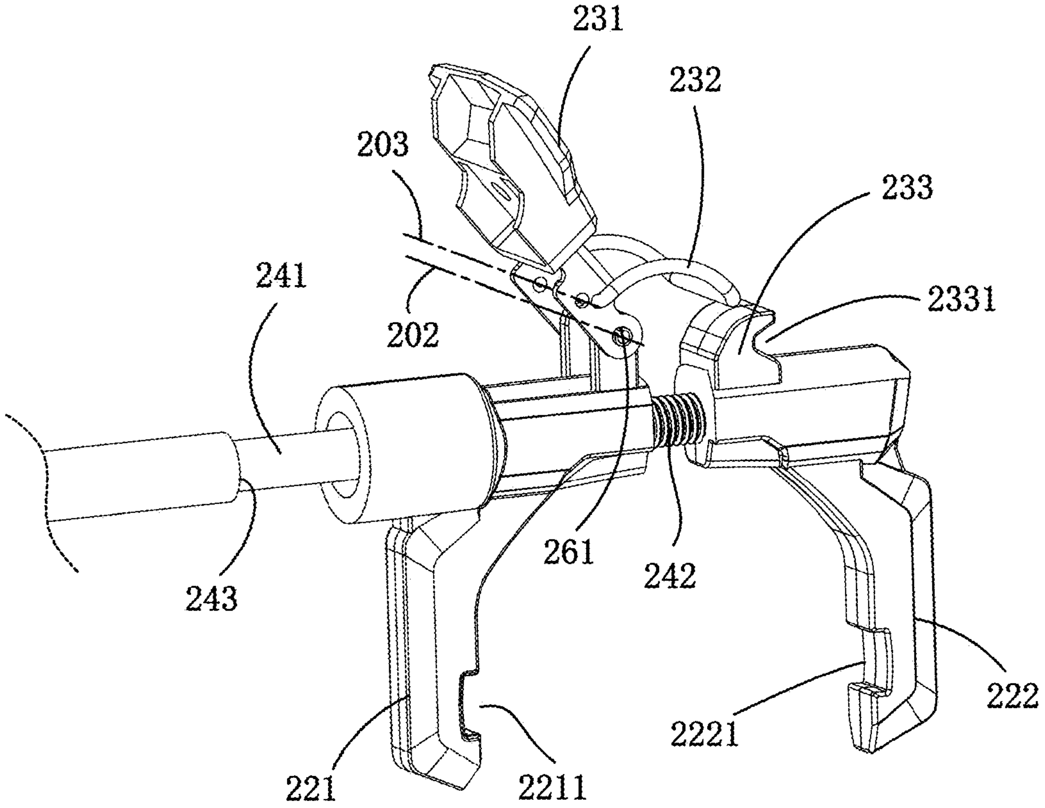
FIG. 4 is a schematic view of a partial structure of an auxiliary handle according to an example of the present application, where a locking assembly is in a released state.
Figure 6:
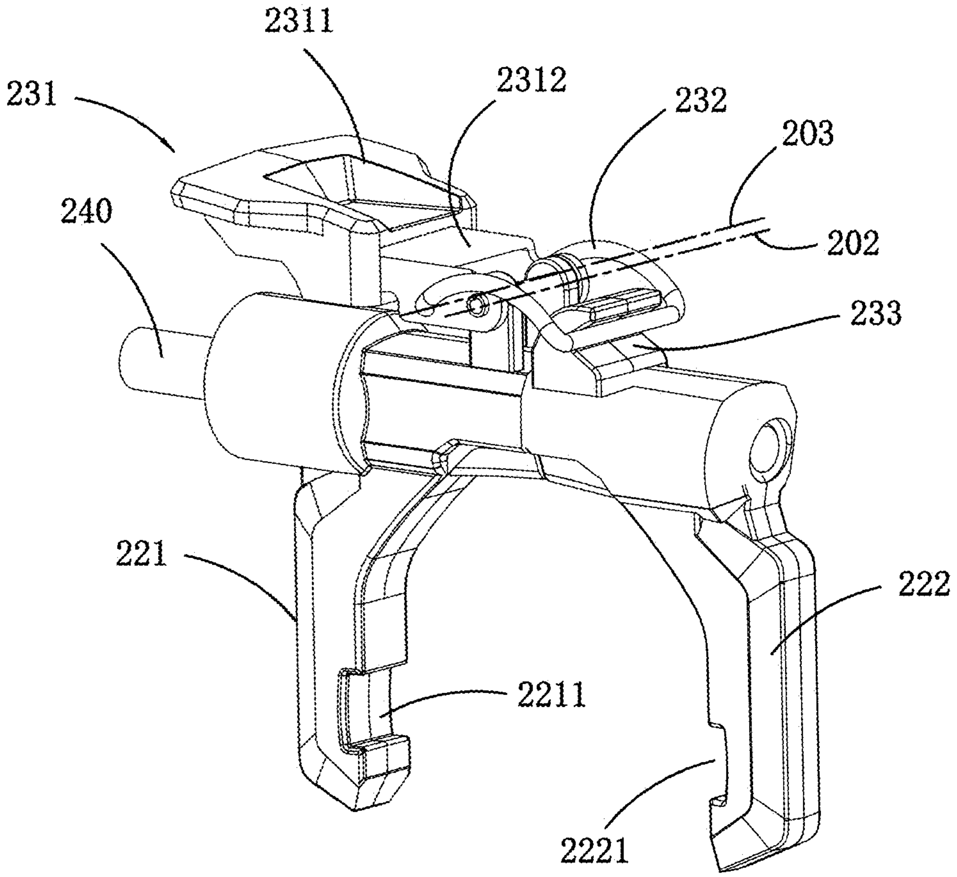
FIG. 6 is a schematic view of a partial structure of an auxiliary handle according to an example of the present application, where a locking assembly is in a locked state.
Figure 7:
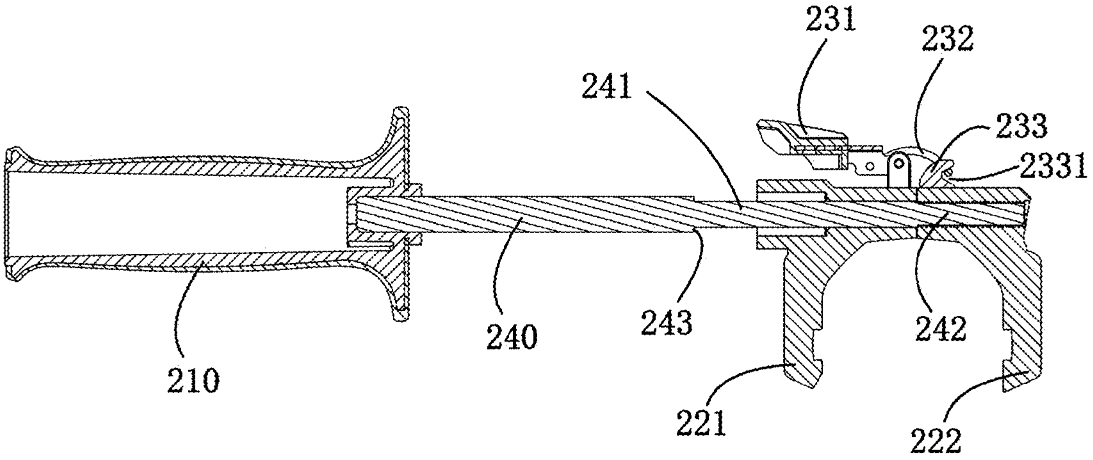
FIG. 7 is a sectional view of an auxiliary handle according to an example of the present application.
Figure 8:
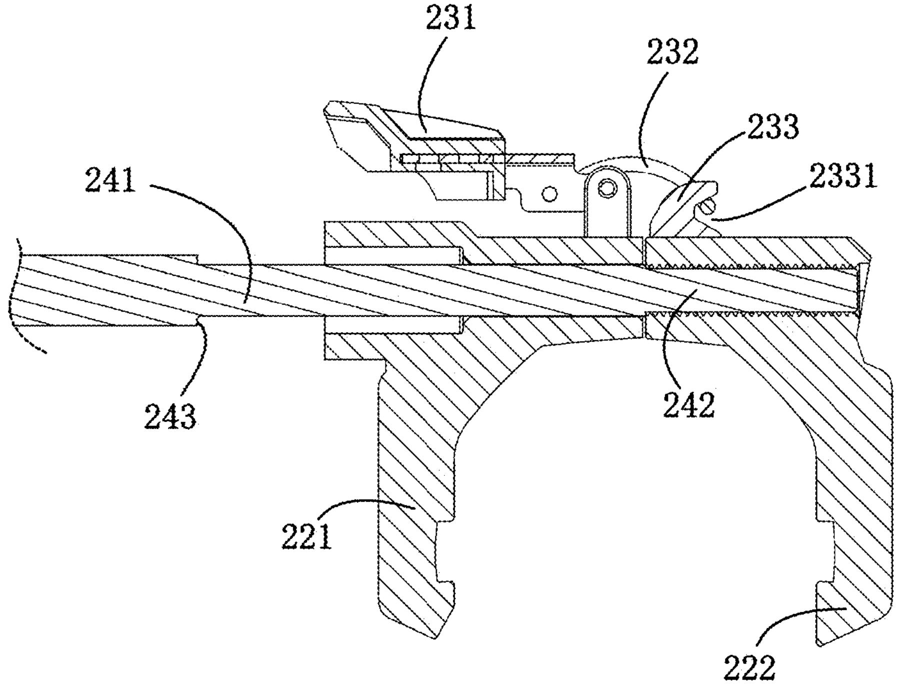
FIG. 8 is a sectional view of a partial structure of an auxiliary handle according to an example of the present application.
Figure 9:
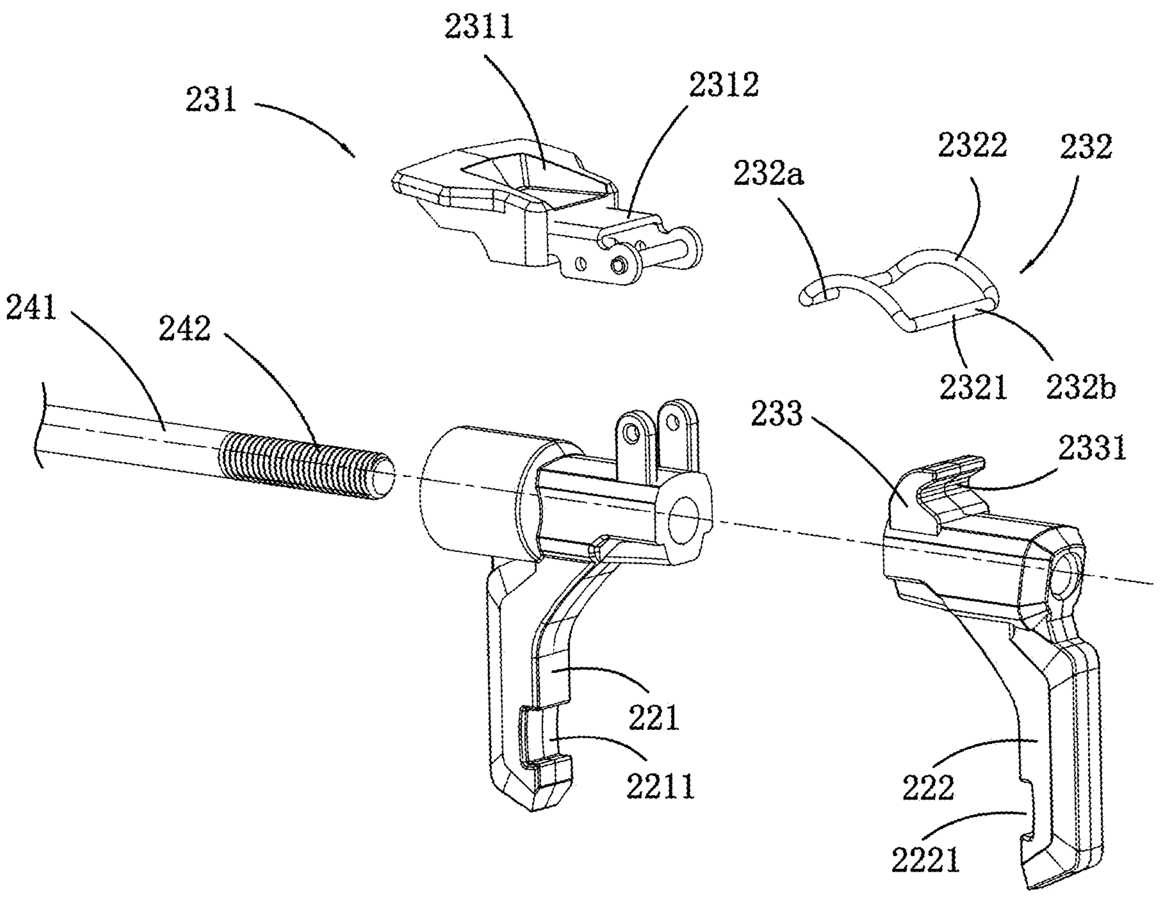
FIG. 9 is an exploded view showing a partial structure of an auxiliary handle according to an example of the present application.

Referring to FIG. 4, FIG. 6, and FIG. 9, the locking assembly 230 further includes a connector 232. The connector 232 connects the first clamping arm 221 to the second clamping arm 222 and is driven by the operation member 231. When the locking assembly 230 is in the locked state, the connector 232 connects the first clamping arm 221 to the second clamping arm 222 so that the first clamping arm 221 and the second clamping arm 222 clamp the first housing 121. The position of the operation member 231 is changed so that the connector 232 can be driven to move. Thus, the first clamping arm 221 is disconnected from the second clamping arm 222 so that the first clamping arm 221 and the second clamping arm 222 move away from each other.

Figure 5:
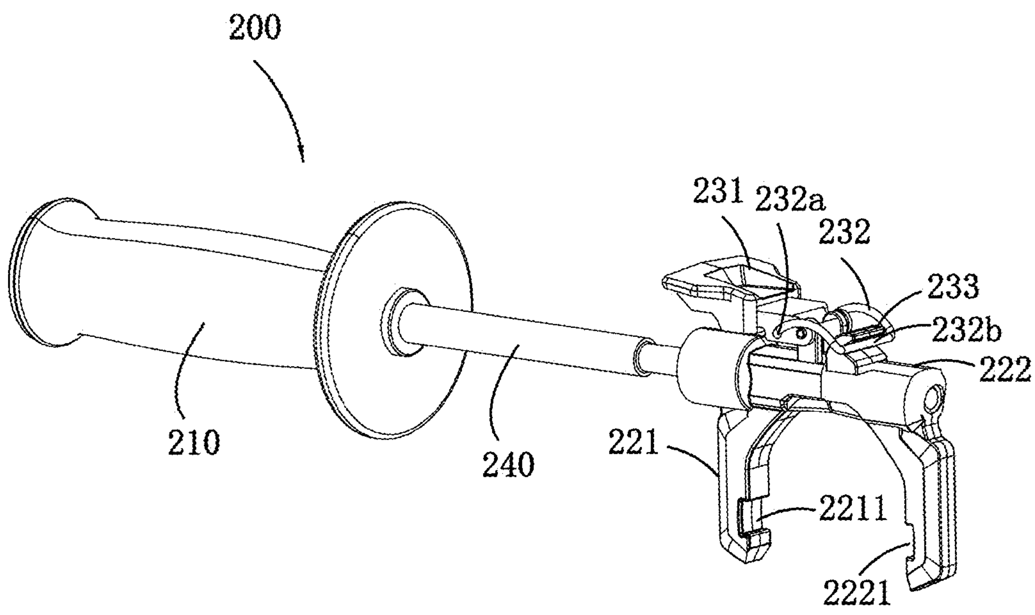
FIG. 5 is a structural view of an auxiliary handle according to an example of the present application.

In this example, the operation member 231 is rotated so that the position state of the operation member 231 is changed. In this manner, the user can hold the second grip 210 with one hand and rotate the operation member 231 with the other hand. Thus, the operation is convenient. Positions of the operation member 231 include a first position (as shown in FIG. 5) corresponding to the locked state and a second position (as shown in FIG. 4) corresponding to the released state. The operation member 231 rotates about a second axis 202 to switch between the first position and the second position. The second axis 202 intersects with the extension direction of the second grip 210.

In some alternative examples, the operation member 231 rotates about the second axis to switch between the first position and the second position, where the second axis is configured to be parallel to the first straight line 201.

In some alternative examples, the operation member 231 performs a translational movement to switch between the first position and the second position. The operation member 231 may perform the translational movement along the first straight line 201 or a direction perpendicular to the first straight line 201.

The operation member 231 is connected to the first clamping arm 221 through the second shaft 261, and the axis of the second shaft 261 is the second axis 202. In this example, the second axis 202 is substantially perpendicular to the first straight line 201 so that a force is applied to the operation member 231 substantially along the direction of the first straight line 201, thereby facilitating the application of the force.

The operation member 231 may drive the connector 232 directly or indirectly. In this example, the connector 232 is directly connected to the operation member 231. In another example, the connector 232 and the operation member 231 may be connected to each other through an adapter rod.

The connector 232 is rotatably connected to the operation member 231. The connector 232 is rotatable relative to the operation member 231 about a third axis 203, where the third axis 203 is offset from the second axis 202. For example, the third axis 203 is parallel to but does not coincide with the second axis 202.

When the operation member 231 is at the first position, the locking assembly 230 is in the locked state and the connector 232 connects the first clamping arm 221 to the second clamping arm 222 so that the first clamping arm 221 and the second clamping arm 222 clamp the first housing 121. In the process where the operation member 231 is rotated from the first position to the second position, the operation member 231 rotates about the second axis 202 and drives the connector 232 to rotate about the third axis 203. Thus, the first clamping arm 221 is disconnected from the second clamping arm 222 so that the first clamping arm 221 and the second clamping arm 222 move away from each other.

A first end **232*a* of the connector 232 is connected to the first clamping arm 221. When the operation member 231 is at the first position, a second end 232*b* of the connector 232 is limited by the second clamping arm 222. A limit member 233 is disposed on the second clamping arm 222. When the operation member 231 is at the first position, the second end 232*b* of the connector 232 is limited by the limit member 233. In the process where the operation member 231 is rotated from the first position to the second position, the operation member 231 drives the connector 232 to move so that the second end 232*b* of the connector 232 is detached from the limit member 233. Thus, the first clamping arm 221 is disconnected from the second clamping arm 222**.

The limit member 233 provided in this example has a limit slot 2331 on the side of the limit member 233 facing away from the operation member 231. The connector 232 provided in this example is annular and includes two first connecting arms 2321 that are parallel to each other and two second connecting arms 2322 that are parallel to each other. One first connecting arm 2321 is rotatably connected to the operation member 231, and the other first connecting arm 2321 can be engaged with the limit slot 2331. That is, the one first connecting arm 2321 is the first end **232*a*, and the other first connecting arm 2321 is the second end 232*b*. The two connecting arms 2322 both extend along an arc. Through the shape change of the arc, the two connecting arms 2322** are prevented from interference during rotation.

When the locking assembly 230 is in the locked state, the second end **232*b* of the connector 232 enters the limit slot 2331, and the operation member 231 is at the first position. The operation member 231 pulls the connector 232 tight so that the connector 232 and the limit member 233 are connected to each other stably. When the locking assembly 230 is switched to the released state, the operation member 231 is rotated so that the connector 232 moves away from the limit slot 2331 to be detached from the limit member 233. The operation member 231 is pulled so that the first clamping arm 221 can be driven to slide along the connecting rod 240. Thus, the first clamping arm 221 and the second clamping arm 222 move away from each other. When the locking assembly 230 is switched to the locked state, the operation member 231 is rotated so that the second end 232*b* of the connector 232 is sleeved on limit member 233, and then the operation member 231 is rotated in an opposite direction so that the second end 232*b* of the connector 232 enters the limit slot 2331. When the operation member 231 is rotated to the first position, the connector 232 and the limit member 233** are fastened to each other.

FIGS. 1 to 13 show one example of the present application. The operation member 231 includes a support portion 2311 and an operation portion 2312. One end of the support portion 2311 is connected to the first clamping arm 221, and the operation portion 2312 is provided at the other end of the support portion 2311. One limit member 233 is provided. Along a direction parallel to the second axis 202, the limit member 233 has a certain thickness so that the connector 232 and the limit member 233 have a relatively large contact area when engaged with each other. The support portion 2311 is made of metal. The operation portion 2312 is made of plastic and is convenient to hold.

Figure 10:
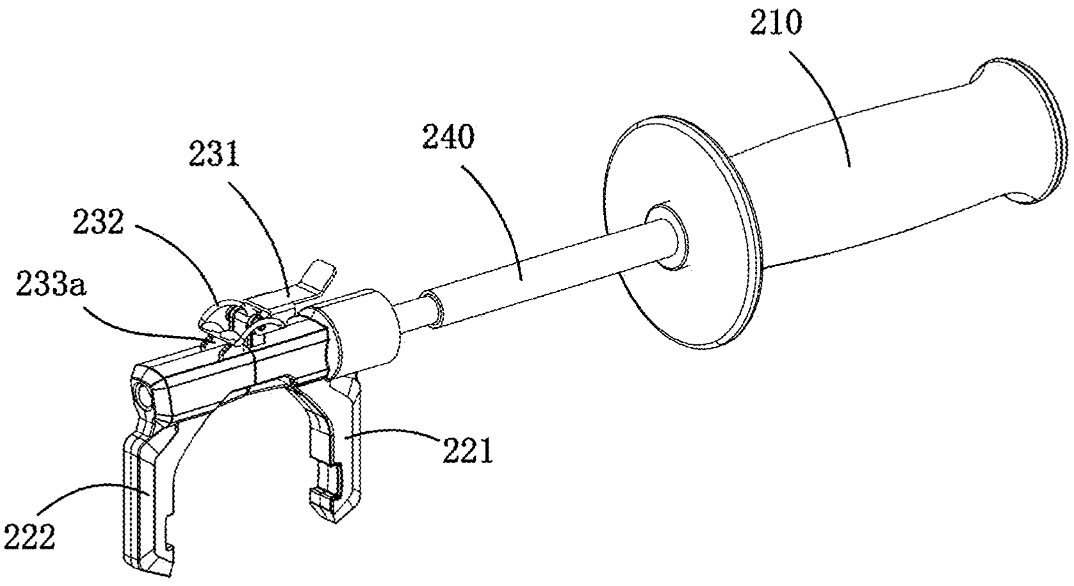
FIG. 10 is a structural view of another auxiliary handle according to an example of the present application.
Figure 11:
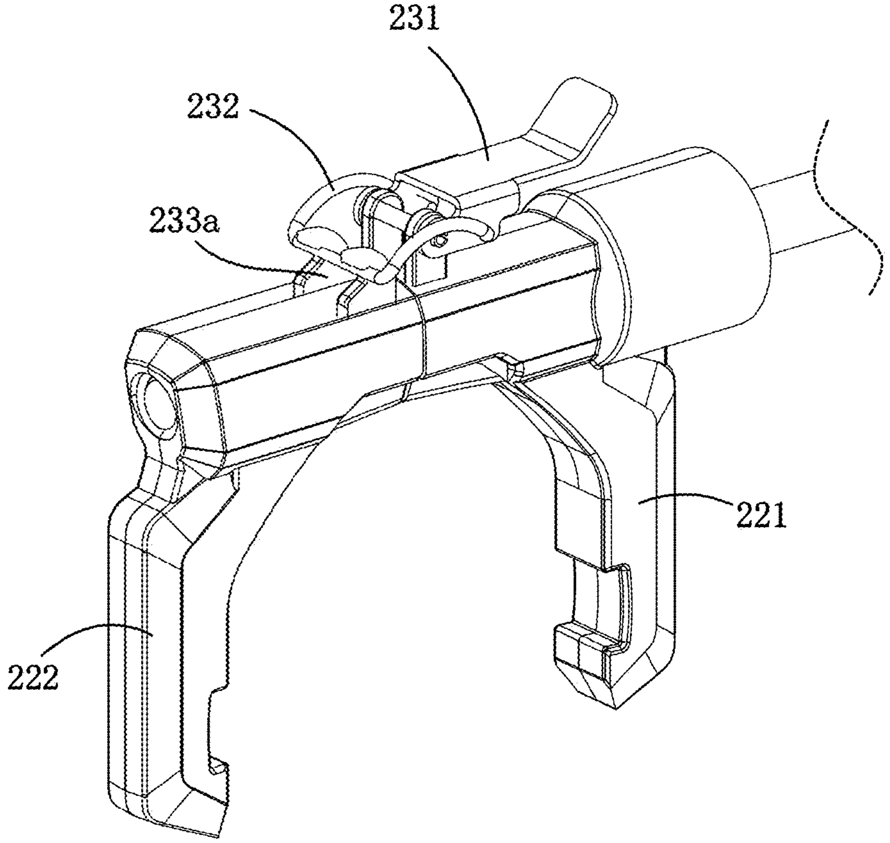
FIG. 11 is a schematic view of a partial structure of another auxiliary handle according to an example of the present application.

Referring to FIGS. 10 and 11, in an example of the present application, the operation member 231 includes a support portion 2311. One end of the support portion 2311 is connected to the first clamping arm 221, and the other end of the support portion 2311 is held by the user. Two or more limit members **233*a* are provided. Along the direction parallel to the second axis 202, all of the limit members 233*a*** are disposed at intervals.

In some examples, the operation member 231 includes the support portion 2311 and the operation portion 2312. The one end of the support portion 2311 is connected to the first clamping arm 221, and the operation portion 2312 is provided at the other end of the support portion 2311 so that it is convenient to hold the operation portion 2312. The two or more limit members 233*a* are provided. Along the direction parallel to the second axis 202, all of the limit members 233*a* are disposed at intervals.

Figure 12:
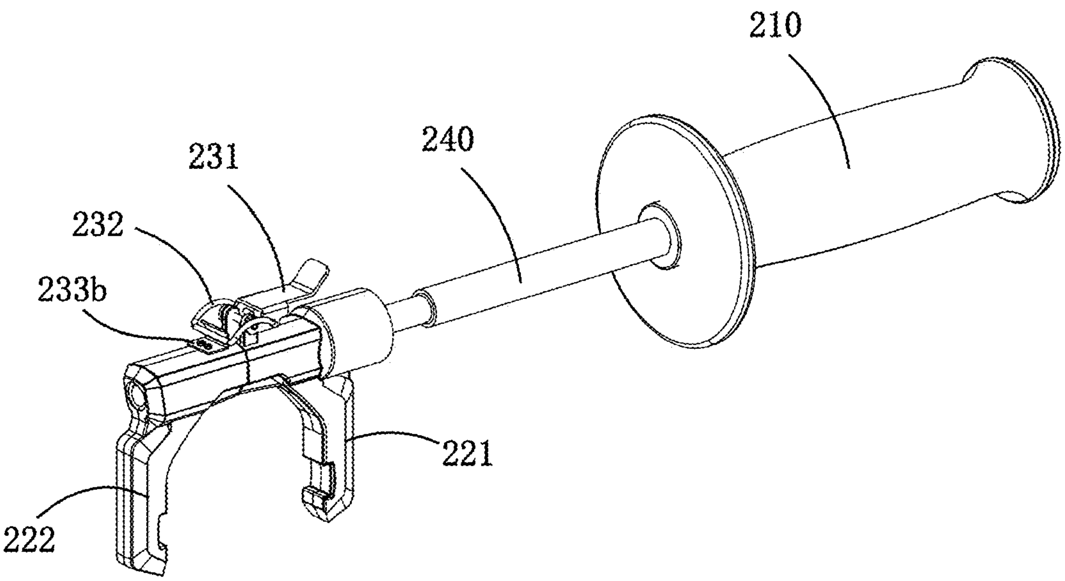
FIG. 12 is a structural view of another auxiliary handle according to an example of the present application.
Figure 13:
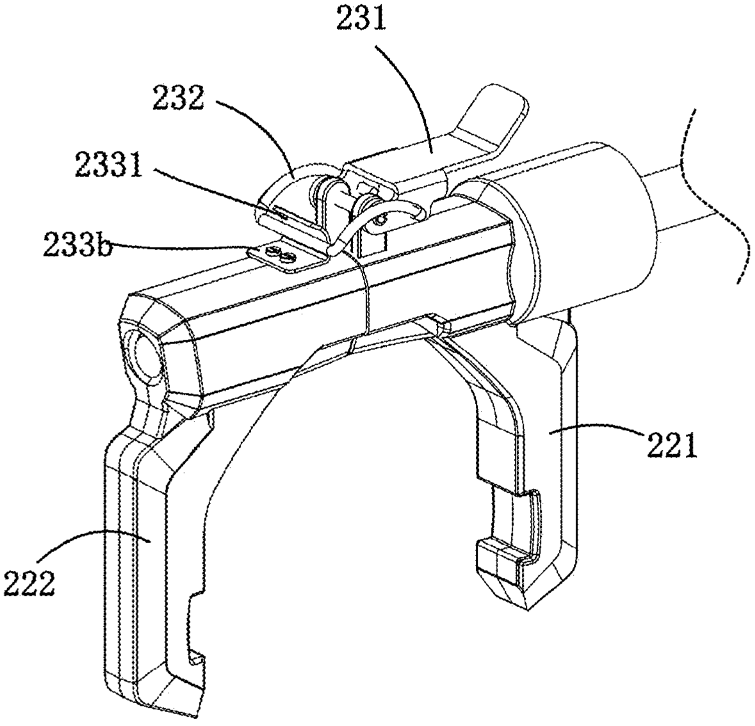
FIG. 13 is a schematic view of a partial structure of another auxiliary handle according to an example of the present application.

The limit member 233 and the second clamping arm 222 may be integrally formed or detachably connected to each other. Referring to FIGS. 12 and 13, in an example of the present application, a limit member 233*b* is a limit piece. The limit piece is bent to form the limit slot 2331. The limit member 233*b* is detachably connected to the second clamping arm 222 through screws so that it is convenient to assemble and replace the limit member 233*b*.

As shown in FIGS. 14 to 25, in an example of the present application, a limit member 233*c* defines a limit space 2332. The second end 232*b* of the connector 232 can be displaced along a sliding direction of the first clamping arm 221 in the limit space 2332 and can abut against the inner wall of the limit space 2332.

When the locking assembly 230 is switched to the released state, the operation member 231 is rotated so that the connector 232 moves away from the first clamping arm 221. When the connector 232 abuts against the inner wall of the limit space 2332, the operation member 231 is continuously rotated causing the force to be transmitted to the first clamping arm 221 in an opposite direction because the limit member 233*c* and the second clamping arm 222 are fixed to each other. The first clamping arm 221 is caused to move away from the second clamping arm 222. In this manner, the first clamping arm 221 and the second clamping arm 222 can be moved away from each other without pulling the operation member 231.

Referring to FIGS. 14 to 21, the limit space 2332 has a channel portion 2333 communicating with the outside. The second end of the connector 232 can enter and exit the limit space 2332 via the channel portion 2333. The connector 232 may exit via the channel portion 2333 so that the first clamping arm 221 and the second clamping arm 222 can move farther away from each other.

A displacement which may be generated by the second end of the connector 232 in the limit space 2332 is 0 mm to 100 mm. The size of the channel portion 2333 is set according to an external dimension of the connector 232 and may be 80% to 500% of the outer diameter of the second end 232*b* of the connector 232.

Figure 14:
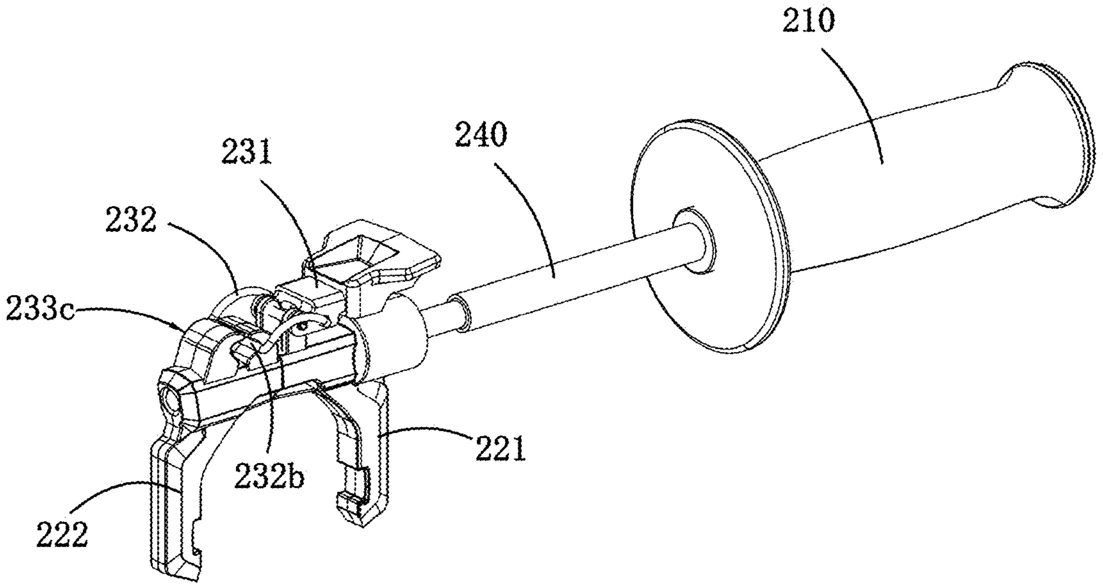
FIG. 14 is a structural view of a fourth auxiliary handle according to an example of the present application, where a limit space has a channel portion.
Figure 15:
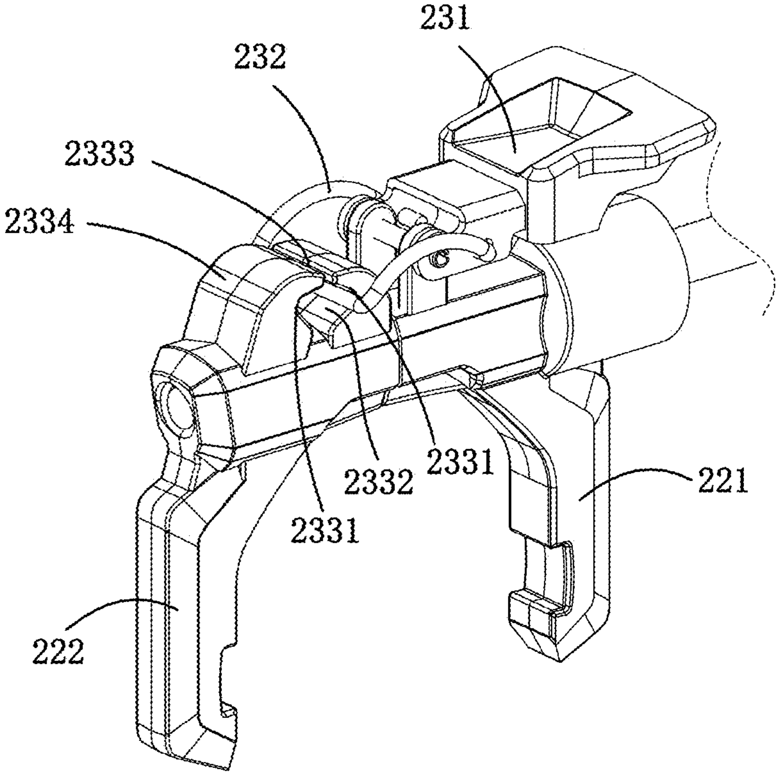
FIG. 15 is a schematic view of a partial structure of a fourth auxiliary handle according to an example of the present application, where a limit space has a channel portion.

Referring to FIGS. 14 and 15, the limit member 233*c* includes two limit portions 2334 disposed opposite to each other. Limit slots 2331 are each provided on the opposite surfaces of the two limit portions 2334. The two limit slots 2331 surround the limit space 2332, and the channel portion 2333 is formed between the two limit portions 2334.

Figure 16:
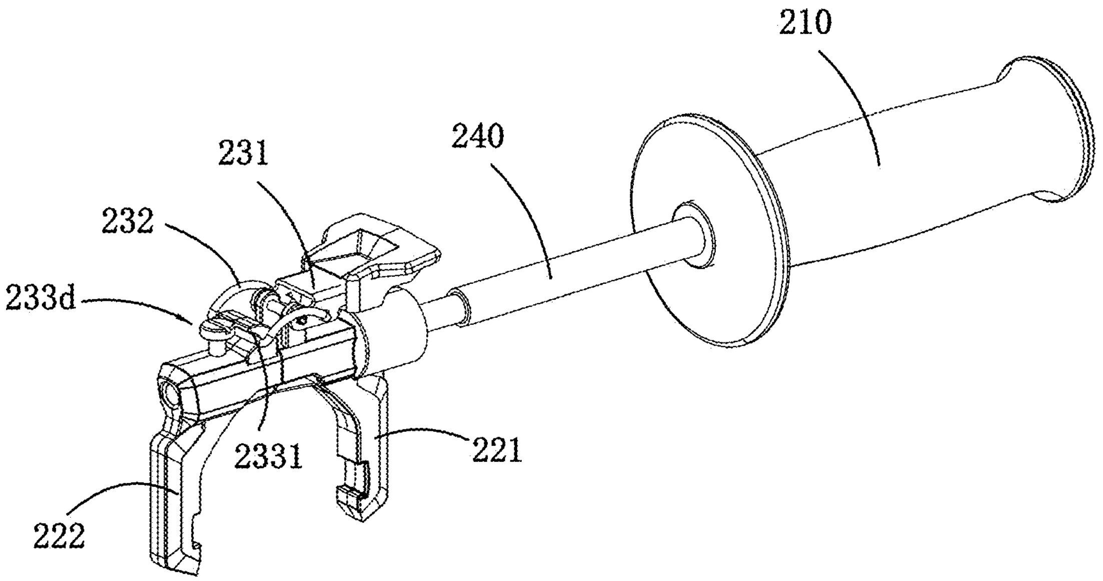
FIG. 16 is a structural view of a fifth auxiliary handle according to an example of the present application, where a limit space has a channel portion.
Figure 17:
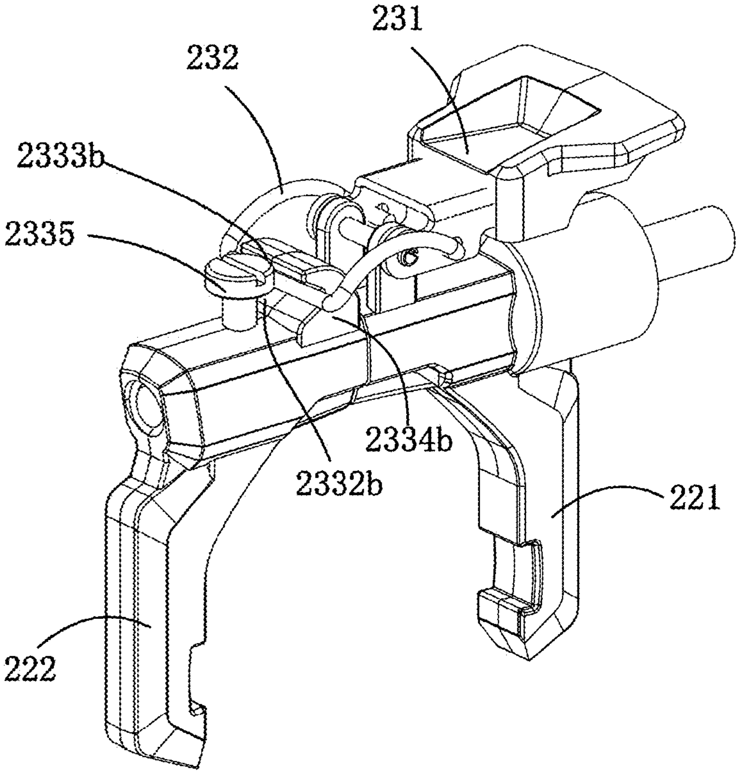
FIG. 17 is a schematic view of a partial structure of a fifth auxiliary handle according to an example of the present application, where a limit space has a channel portion.

Referring to FIGS. 16 and 17, in an example of the present application, a limit member 233*d* includes a limit portion 2334*b* and a limit column 2335. The limit slot 2331 is provided on the side of the limit portion 2334*b* facing away from the first clamping arm 221. The limit column 2335 is disposed on a side of the limit slot 2331 to surround a limit space 2332*b* with the limit slot 2331. A channel portion 2333*b* is formed between the limit portion 2334*b* and the limit column 2335. The limit column 2335 may be a screw. The limit space 2332*b* is surrounded by the head of the screw and the limit portion 2334*b*, thereby facilitating mounting and detachment.

Figure 18:
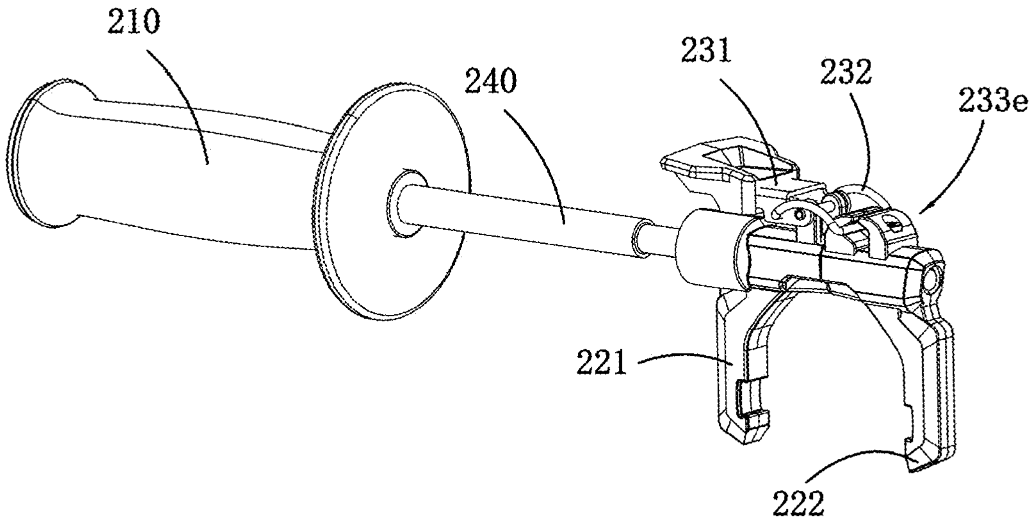
FIG. 18 is a structural view of a sixth auxiliary handle according to an example of the present application, where a limit space has a channel portion.
Figure 19:
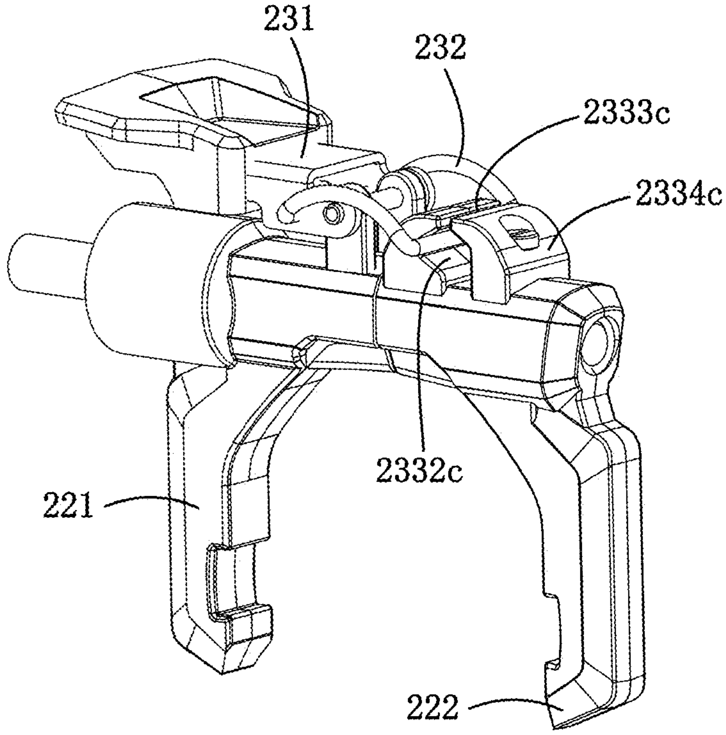
FIG. 19 is a schematic view of a partial structure of a sixth auxiliary handle according to an example of the present application.

Referring to FIGS. 18 and 19, in an example of the present application, a limit member 233*e* includes two limit portions 2334*c* disposed opposite to each other. The two limit portions 2334*c* surround a limit space 2332*c*, and a channel portion 2333*c* is formed between the two limit portions 2334*c* At least one of the two limit portions 2334*c* is detachably connected to the second clamping arm 222, thereby facilitating assembly. In this example, the limit portion 2334*c* farther from the first clamping arm 221 and the second clamping arm 222 are detachably connected to each other through a screw, thereby facilitating mounting and detachment.

The limit member 233 and the second clamping arm 222 may be integrally formed or detachably connected to each other. The two limit portions 2334*c* may be disposed separately or integrally formed.

Figure 20:
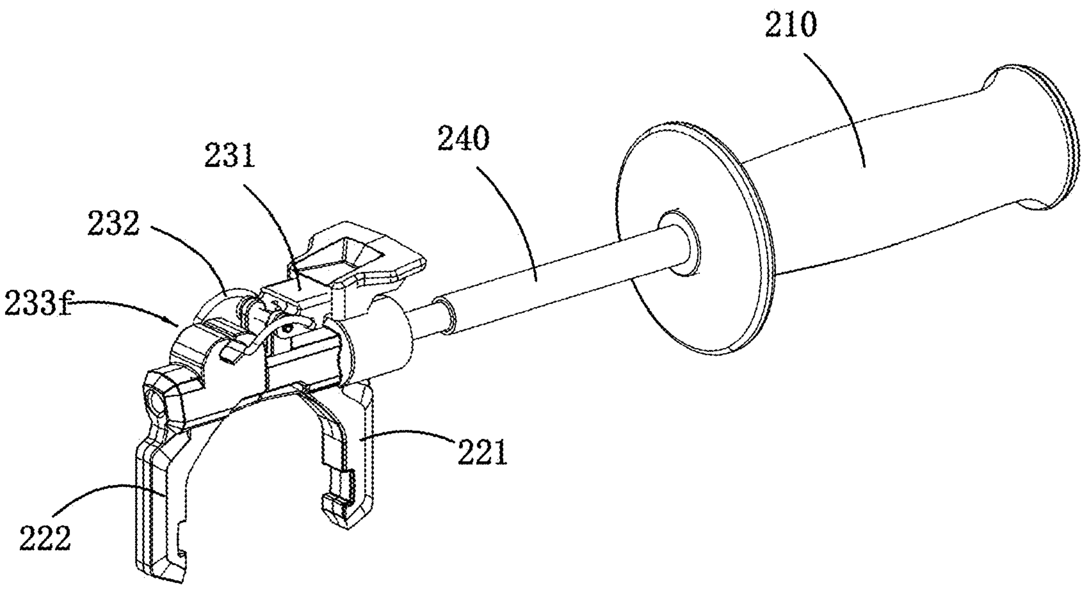
FIG. 20 is a structural view of a seventh auxiliary handle according to an example of the present application, where a limit space has a channel portion.
Figure 21:
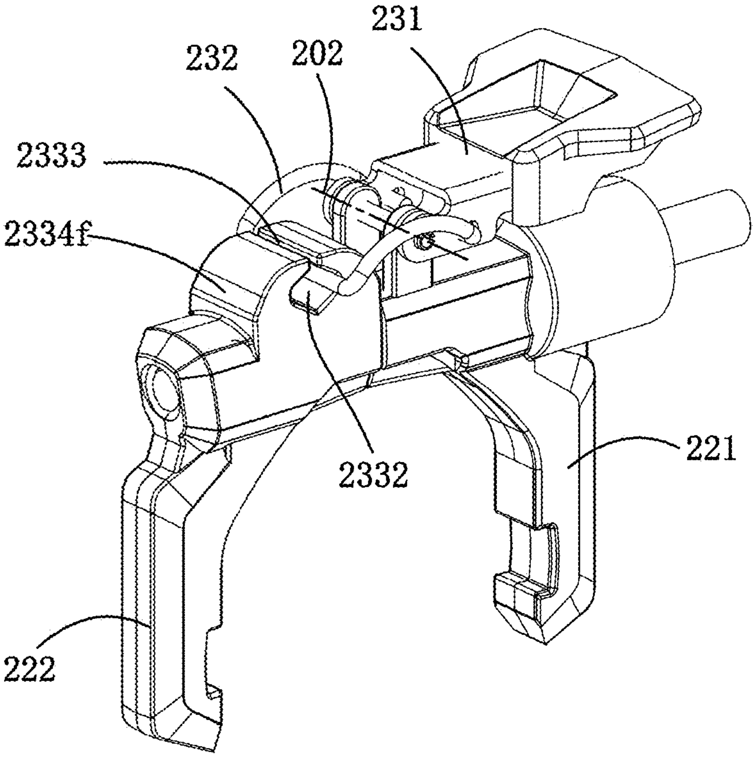
FIG. 21 is a schematic view of a partial structure of a seventh auxiliary handle according to an example of the present application.

Referring to FIGS. 20 and 21, in an example of the present application, a limit member 233*f* includes two limit portions 2334*f* disposed opposite to each other. The two limit portions 2334*f* are integrally formed. Along the direction parallel to the second axis 202, the width of the limit member 233*f* is not less than the width of the second clamping arm 222 so that the connector 232 and the limit member 233*f* have a relatively large contact area when engaged with each other.

Referring to FIGS. 22 to 25, in an example of the present application, the second end of the connector 232 is located in the limit space 2332 and cannot exit the limit space 2332. The limit member 233 is detachably connected to the second clamping arm 222. Thus, it is convenient to mount the connector 232.

Figure 22:
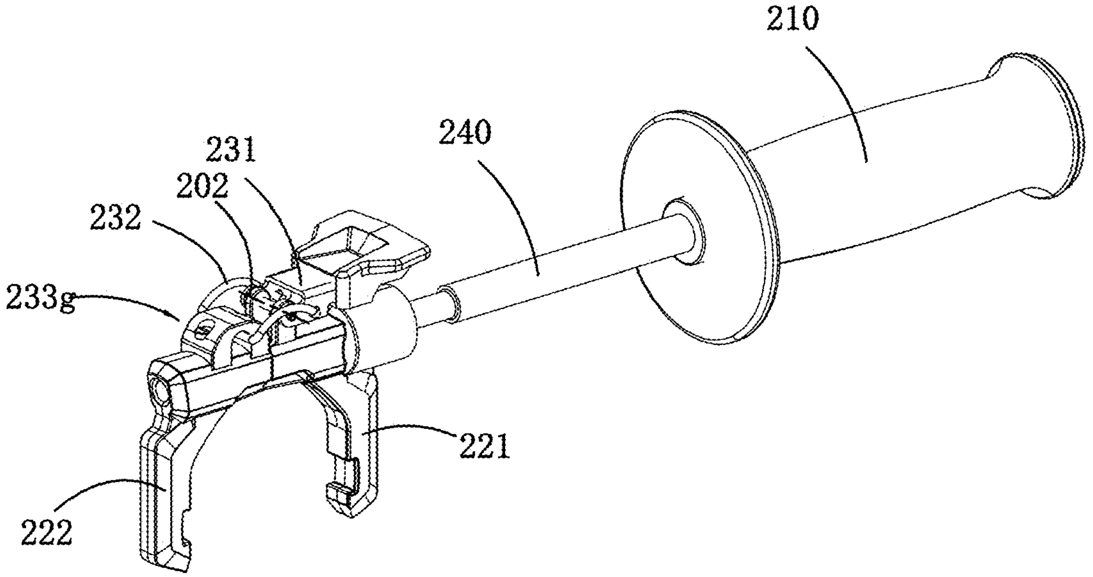
FIG. 22 is a structural view of an eighth auxiliary handle according to an example of the present application, where a limit space has no channel portion.
Figure 23:
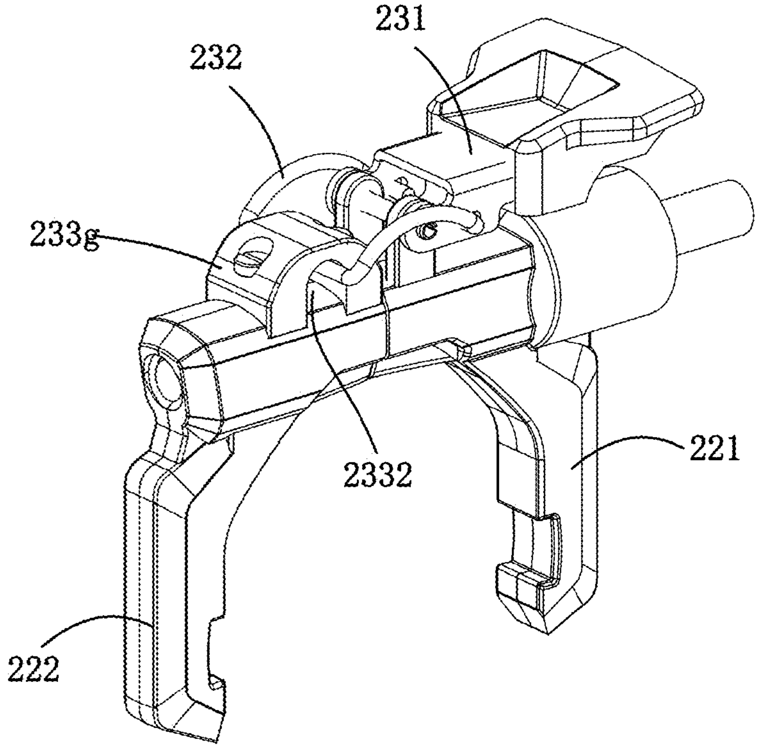
FIG. 23 is a schematic view of a partial structure of an eighth auxiliary handle according to an example of the present application, where a limit space has no channel portion.

Referring to FIGS. 22 and 23, in an example of the present application, a limit member 233*g* is detachably connected to the second clamping arm 222 through a screw. Along the direction parallel to the second axis 202, the limit member 233*g* has a certain thickness so that the connector 232 and the limit member 233*g* have a relatively large contact area when engaged with each other.

Figure 24:
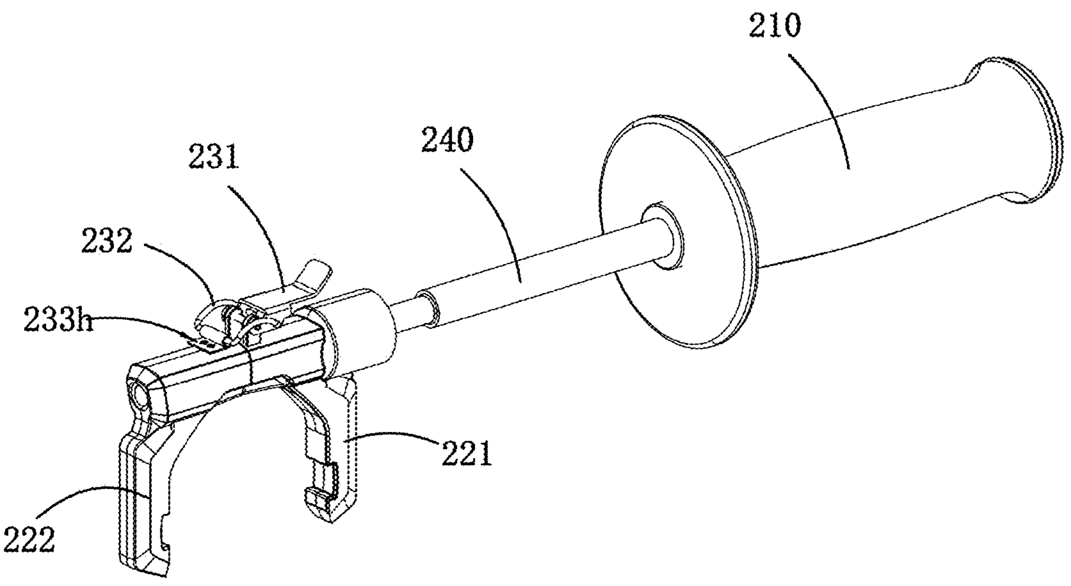
FIG. 24 is a structural view of a ninth auxiliary handle according to an example of the present application, where a limit space has no channel portion.
Figure 25:
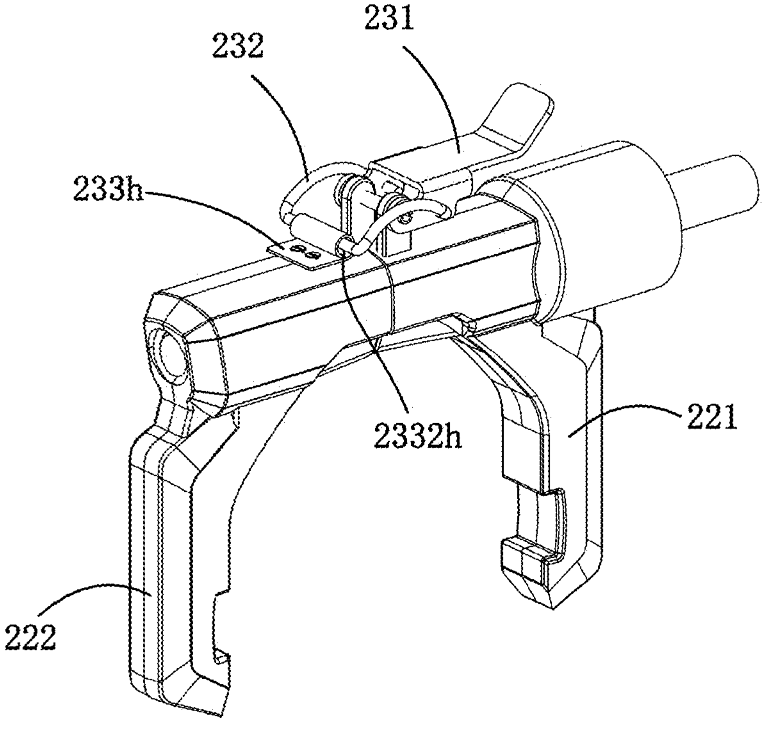
FIG. 25 is a schematic view of a partial structure of a ninth auxiliary handle according to an example of the present application, where a limit space has no channel portion.

Referring to FIGS. 24 and 25, in an example of the present application, a limit member 233*h* is a limit piece. The limit piece is bent to form a limit space 2332*h*. The limit member 233*h* is detachably connected to the second clamping arm 222 through screws so that it is convenient to assemble and replace the limit member 233*h*.

Figure 26:
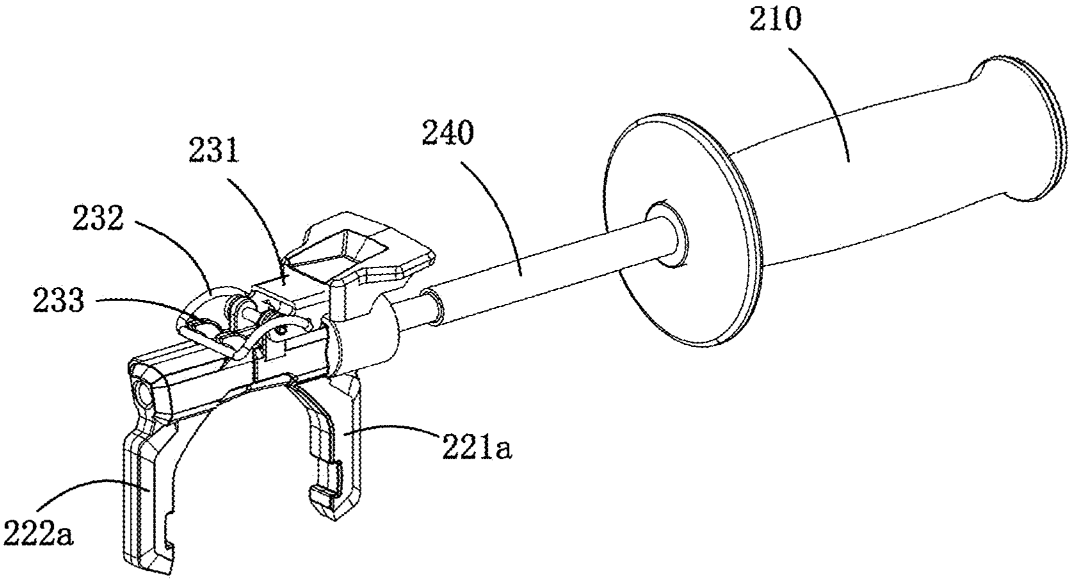
FIG. 26 is a structural view of an auxiliary handle according to an example of the present application.
Figure 27:
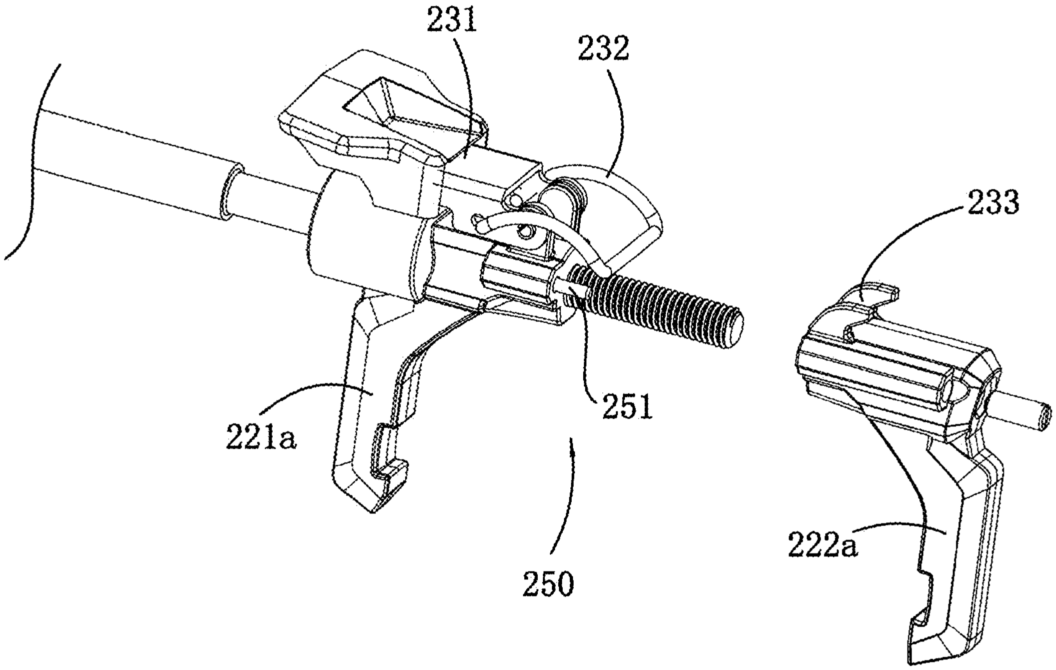
FIG. 27 is an exploded view showing a partial structure of an auxiliary handle according to an example of the present application.
Figure 28:
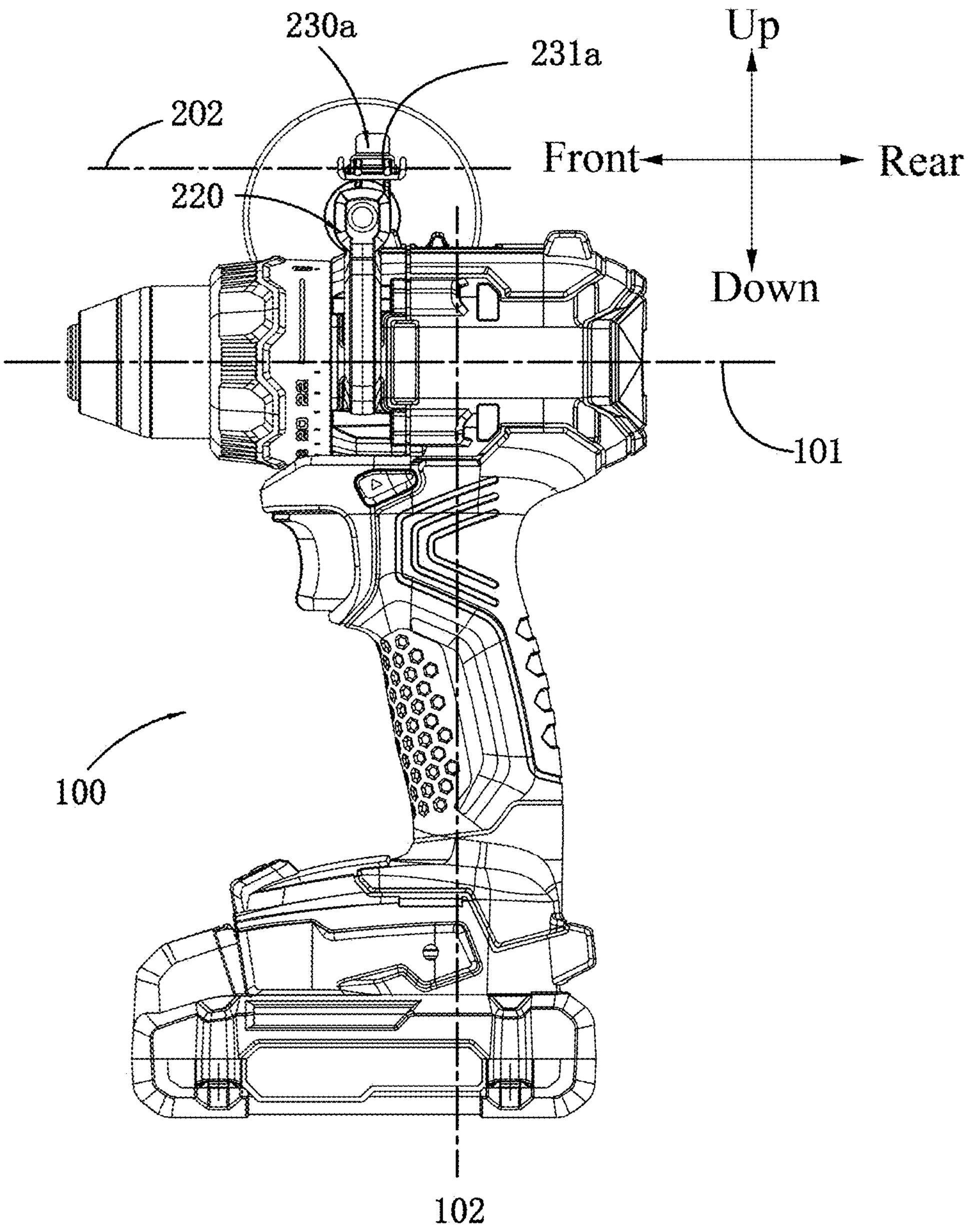
FIG. 28 is a side view of a power tool combination according to an example of the present application.

Referring to FIGS. 26 and 27, in an example of the present application, a guide assembly 250 is disposed between a first clamping arm 221*a* and a second clamping arm 222*a*. When moving away from each other or approaching each other, the first clamping arm 221*a* and the second clamping arm 222*a* are guided by the guide assembly 250, thereby improving movement stability.

The guide assembly 250 includes a guide column 251 and a guide slot. One of the guide column 251 and the guide slot is disposed in the first clamping arm 221*a*, and the other one of the guide column 251 and the guide slot is disposed in the second clamping arm 222*a*. When the first clamping arm 221*a* and the second clamping arm 222*a* move away from each other or approach each other, the guide column 251 slides along the guide slot, thereby improving the movement stability.

In this example, the guide column 251 is disposed in the first clamping arm 221*a*, and the guide slot is disposed in the second clamping arm 222*a*.

Figure 29:
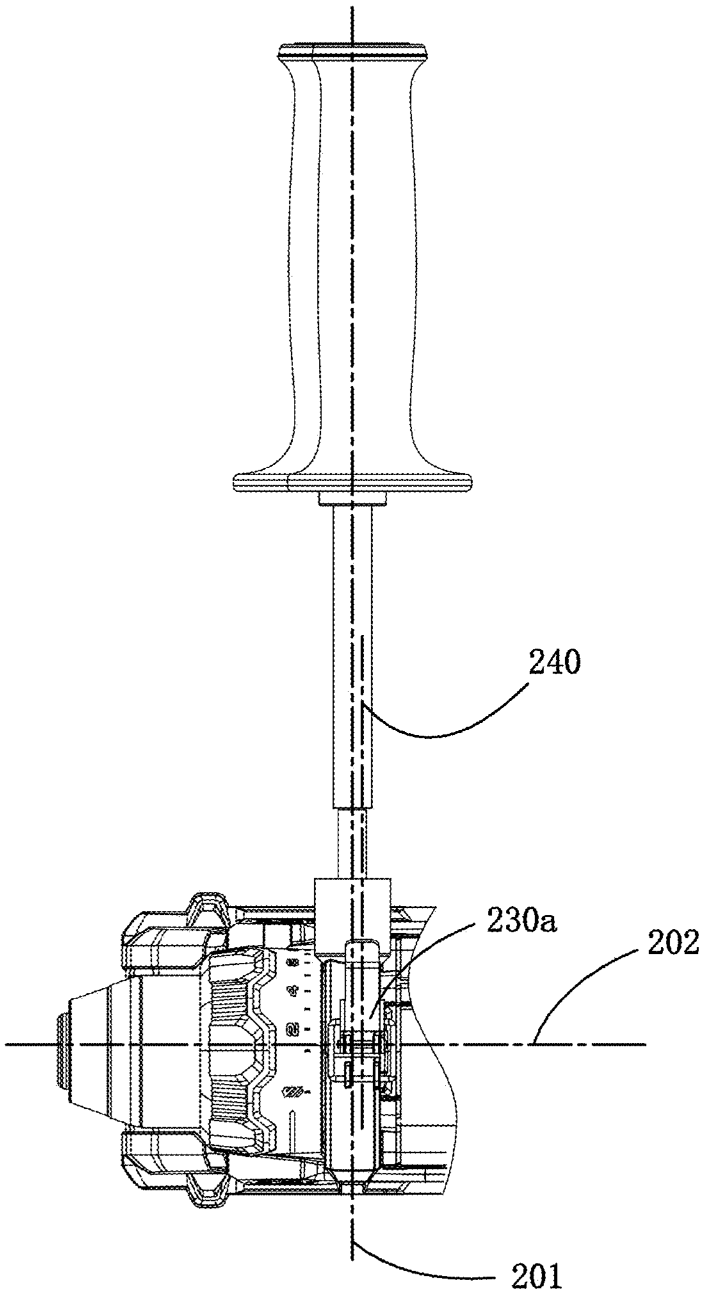
FIG. 29 is a top view of a power tool combination according to an example of the present application.

Referring to FIGS. 28 to 31, in an example of the present application, an operation member 231*a* is rotated about the second axis 202 to switch between the first position and the second position, and the connecting rod 240 extends along the first straight line 201. As shown in FIG. 29, a locking assembly 230*a* has a central axis 240. The central axis 204 extends along a direction perpendicular to the second axis 202 and the middle position of the locking assembly 230. The central axis 204 is offset from the first straight line 201.

Figure 30:
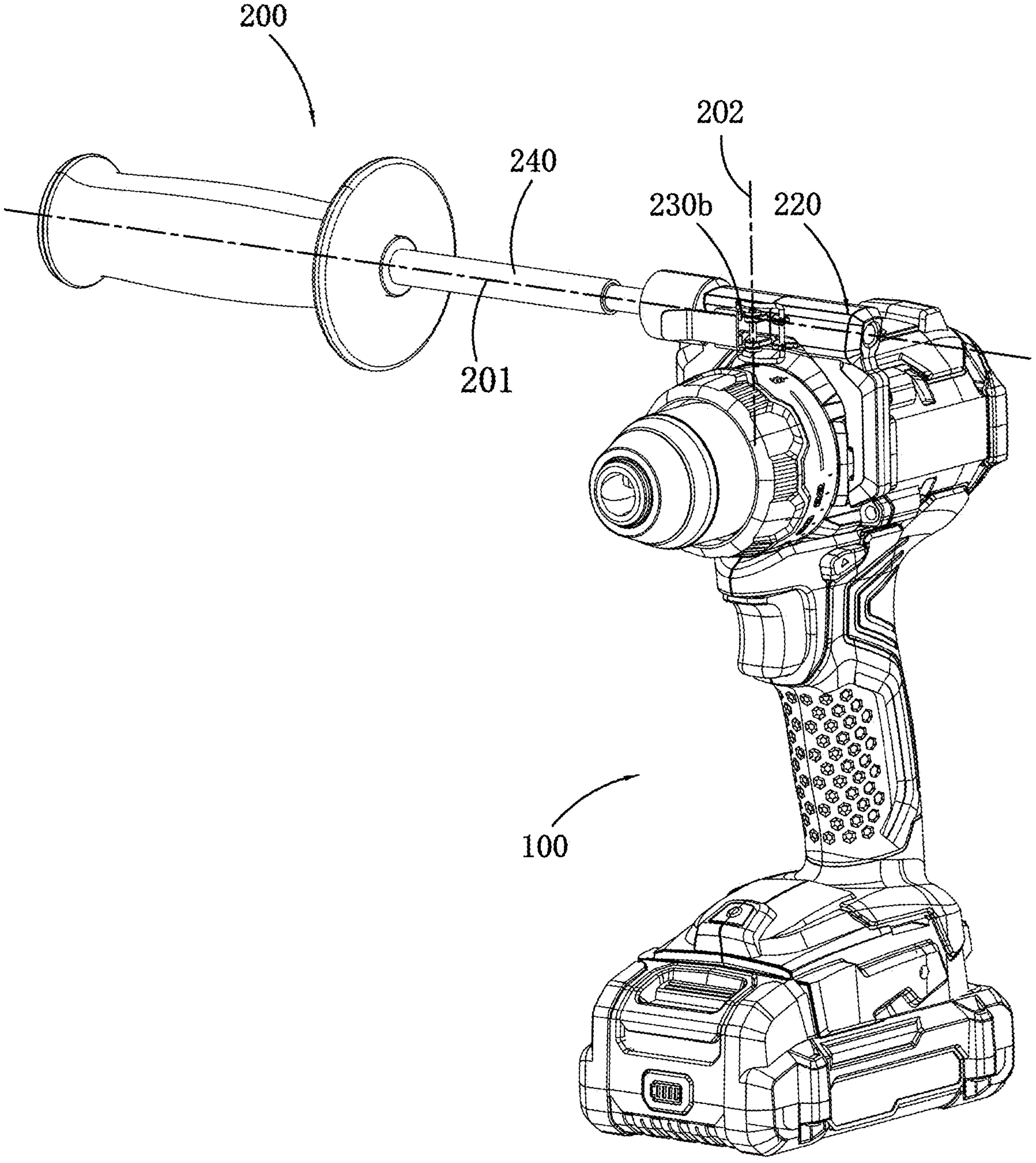
FIG. 30 is a structural view of another power tool combination according to an example of the present application.
Figure 31:
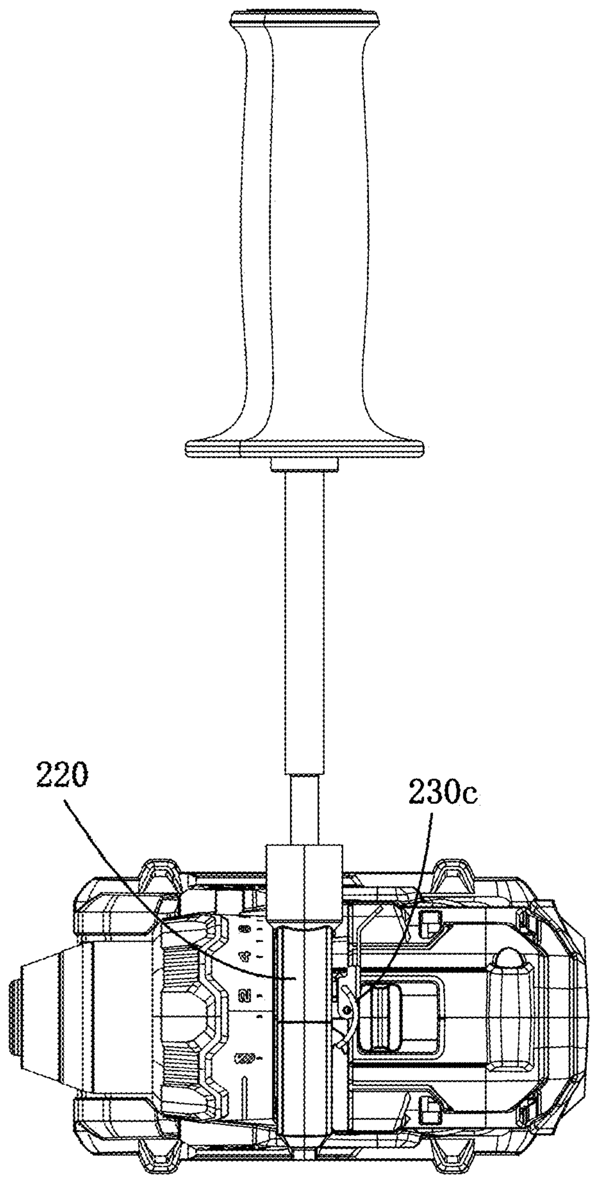
FIG. 31 is a top view of another power tool combination according to an example of the present application.

As shown in FIGS. 30 and 31, the first straight line 201 and the second axis 202 are perpendicular to each other and are not in the same plane. That is to say, the second axis 202 is in a plane perpendicular to the first straight line 201. In this manner, the locking assembly 230 may be disposed on a side of the clamping assembly 220. A locking assembly 230*b* may be disposed on the front side of the clamping assembly 220 and the upper side of the first housing. As shown in FIG. 31, a locking assembly 230*c* may be disposed on the rear side of the clamping assembly 220 and the upper side of the first housing.

In this example, the auxiliary handle 200 may use the structure in any one of the preceding examples.

The basic principles, main features, and advantages of the present application are shown and described above. It is to be understood by those skilled in the art that the preceding examples do not limit the present application in any form, and all technical solutions obtained through equivalent substitutions or equivalent transformations fall within the scope of the present application.

What is claimed is:

1. A power tool combination, comprising:

a power tool comprising a housing comprising a substantially tubular first housing and a first grip for holding, wherein the first grip is formed on or connected to the first housing; and an auxiliary handle comprising:

a second grip;

a clamping assembly connected to the second grip and comprising a first clamping arm and a second clamping arm that are disposed opposite to each other to clamp the first housing; and a locking assembly having a locked state where a relative movement between the clamping assembly and the first housing is restrained and a released state where the first clamping arm and the second clamping arm are caused to move away from each other to allow the relative movement between the clamping assembly and the first housing, wherein the locking assembly comprises an operation member, when a position state of the operation member is changed, the locking assembly is switched between the locked state and the released state, and, when the locking assembly is switched to the released state, the operation member applies a drive force to at least one of the first clamping arm and the second clamping arm so that the first clamping arm and the second clamping arm move away from each other, and wherein the auxiliary handle further includes a connecting rod, the connecting rod including a smooth segment and a threaded segment, where the smooth segment is connected to the second grip, and the threaded segment is disposed at an end of the smooth segment facing away from the second grip.

2. The power tool combination according to claim 1, wherein the at least one of the first clamping arm and the second clamping arm is connected to the operation member.

3. The power tool combination according to claim 1, wherein the locking assembly further comprises a connector connecting the first clamping arm to the second clamping arm.

4. The power tool combination according to claim 3, wherein the connector is driven by the operation member.

5. The power tool combination according to claim 3, wherein positions of the operation member comprise a first position corresponding to the locked state and a second position corresponding to the released state, and the first position is different from the second position.

6. The power tool combination according to claim 5, wherein the operation member rotates about a second axis to switch between the first position and the second position, and the second axis intersects with an extension direction of the second grip.

7. The power tool combination according to claim 5, wherein the operation member rotates about a second axis to switch between the first position and the second position, the connector is rotatably connected to the operation member and is rotatable relative to the operation member about a third axis, and the third axis is offset from the second axis.

8. The power tool combination according to claim 5, wherein a first end of the connector is connected to the first clamping arm, and a second end of the connector is limited by the second clamping arm when the operation member is at the first position.

9. The power tool combination according to claim 8, wherein a limit member is disposed on the second clamping arm, and the second end of the connector is limited by the limit member.

10. The power tool combination according to claim 1, wherein, when the position state of the operation member is changed, the operation member drives the at least one of the first clamping arm and the second clamping arm to slide along an extension direction of the second grip.

11. The power tool combination according to claim 1, wherein, when the position state of the operation member is changed, a position state of the second grip relative to the housing is not changed.

12. The power tool combination according to claim 1, wherein, when the position state of the operation member is changed, a position of the operation member relative to the second grip is changed.

13. The power tool combination according to claim 1, wherein the first housing is configured to have a longitudinal axis, and the locking assembly is located above the first housing in a direction of the longitudinal axis.

14. The power tool combination according to claim 13, wherein an extension direction of the second grip is substantially perpendicular to the longitudinal axis.

15. A power tool combination, comprising:

a power tool comprising a housing comprising a substantially tubular first housing and a first grip for holding, wherein the first grip is formed on or connected to the first housing; and an auxiliary handle comprising a second grip, a clamping assembly connected to the second grip and comprising a first clamping arm and a second clamping arm that are disposed opposite to each other to clamp the first housing, and a locking assembly having a locked state where a relative movement between the clamping assembly and the first housing is restrained and a released state where the first clamping arm and the second clamping arm are caused to move away from each other to allow the relative movement between the clamping assembly and the first housing, wherein the locking assembly further comprises an operation member, when a position state of the operation member is changed, the operation member drives at least one of the first clamping arm and the second clamping arm to move, and, when the position state of the operation member is changed, a position state of the second grip relative to the housing is not changed, and wherein the auxiliary handle further includes a connecting rod, the connecting rod including a smooth segment and a threaded segment, where the smooth segment is connected to the second grip, and the threaded segment is disposed at an end of the smooth segment facing away from the second grip.

16. An auxiliary handle suitable for connection to a substantially tubular first housing of a power tool comprising:

a second grip;

a clamping assembly connected to the second grip and comprising a first clamping arm and a second clamping arm that are disposed opposite to each other to clamp the first housing; and a locking assembly having a locked state where a relative movement between the clamping assembly and the first housing is restrained and a released state where the first clamping arm and the second clamping arm are caused to move away from each other to allow the relative movement between the clamping assembly and the first housing, wherein the locking assembly comprises an operation member, when a position state of the operation member is changed, the locking assembly is switched between the locked state and the released state, and, when the locking assembly is switched to the released state, the operation member applies a drive force to at least one of the first clamping arm and the second clamping arm so that the first clamping arm and the second clamping arm move away from each other, and wherein the auxiliary handle further includes a connecting rod, the connecting rod including a smooth segment and a threaded segment, where the smooth segment is connected to the second grip, and the threaded segment is disposed at an end of the smooth segment facing away from the second grip.

17. The auxiliary handle according to claim 16, wherein, when the position state of the operation member is changed, the operation member drives the at least one of the first clamping arm and the second clamping arm to slide along an extension direction of the second grip.

18. The auxiliary handle according to claim 16, wherein, when the position state of the operation member is changed, a position state of the second grip relative to the first housing is not changed.

19. The auxiliary handle according to claim 16, wherein when the position state of the operation member is changed, a position of the operation member relative to the second grip is changed.

* * * * *